(12) United States Patent
Tal et al.

(10) Patent No.: US 11,343,672 B2
(45) Date of Patent: *May 24, 2022

(54) SECURE COMMUNICATION ENCRYPTION AND DECRYPTION MECHANISM IN A WIRELESS COMMUNICATION SYSTEM

(71) Applicant: CoreTigo Ltd., Netanya (IL)

(72) Inventors: Nir Efraim Joseph Tal, Haifa (IL); Dan Wolberg, Moshav Yanuv (IL); Alex Regev, Herzeliya (IL)

(73) Assignee: Coretigo Ltd., Netanya (IL)

( * ) Notice: Subject to any disclaimer, the term of this patent is extended or adjusted under 35 U.S.C. 154(b) by 81 days.

This patent is subject to a terminal disclaimer.

(21) Appl. No.: 16/794,280

(22) Filed: Feb. 19, 2020

(65) Prior Publication Data
US 2020/0267131 A1 Aug. 20, 2020

Related U.S. Application Data

(60) Provisional application No. 62/850,766, filed on May 21, 2019, provisional application No. 62/807,874, filed on Feb. 20, 2019.

(51) Int. Cl.
*H04W 12/0433* (2021.01)
*H04B 1/713* (2011.01)
(Continued)

(52) U.S. Cl.
CPC ........ *H04W 12/0433* (2021.01); *H04B 1/713* (2013.01); *H04L 9/0618* (2013.01); *H04L 9/0643* (2013.01); *H04L 9/08* (2013.01); *H04L 9/085* (2013.01); *H04L 9/0869* (2013.01); *H04L 9/0894* (2013.01); *H04L 9/14* (2013.01);
(Continued)

(58) Field of Classification Search
None
See application file for complete search history.

(56) References Cited

U.S. PATENT DOCUMENTS 5,657,390 A 8/1997 Elgamal et al.
5,722,059 A * 2/1998 Campana, Jr. ..... G08B 21/0222
375/136

(Continued)

OTHER PUBLICATIONS

Heynicke et. al., "IO-Link Wireless Enhanced Sensors and Actuators for Industry 4.0 Networks", AMA Conferences 2017—SENSOR 2017 and IRS2 2017. (Year: 2017).*

(Continued)

*Primary Examiner* — Eleni A Shiferaw
*Assistant Examiner* — Bassam A Noaman
(74) *Attorney, Agent, or Firm* — M&B IP Analysts, LLC

(57) ABSTRACT

A system and method for secure communications between a master and a plurality of devices in a wireless communications network are provided. The method includes encrypting, on said master, downlink plaintext for multicast transmission to a plurality of devices over a wireless communications link utilizing a symmetric key encryption algorithm in accordance with a first counter value and a shared symmetric session key; and decrypting, on one of said devices, multicast downlink cyphertext received from said master over said wireless communications link utilizing a symmetric key decryption algorithm in accordance with a second counter value and said shared symmetric session key.

20 Claims, 19 Drawing Sheets

(51) Int. Cl.
*H04L 9/32* (2006.01)
*H04L 69/323* (2022.01)
*H04L 9/08* (2006.01)
*H04L 9/06* (2006.01)
*H04L 9/14* (2006.01)
*H04L 12/18* (2006.01)
*H04L 29/06* (2006.01)
*H04W 12/03* (2021.01)
*H04W 12/037* (2021.01)
*H04W 12/50* (2021.01)

(52) U.S. Cl.
CPC .......... *H04L 9/3239* (2013.01); *H04L 9/3242* (2013.01); *H04L 12/189* (2013.01); *H04L 63/0435* (2013.01); *H04L 69/323* (2013.01); *H04W 12/03* (2021.01); *H04W 12/037* (2021.01); *H04W 12/50* (2021.01); *H04L 2209/80* (2013.01)

(56) References Cited

U.S. PATENT DOCUMENTS

| | | | |
|---|---|---|---|
| 6,751,249 | B1 | 6/2004 | Cannon et al. |
| 8,467,526 | B2* | 6/2013 | Kunigk ................ H04L 9/0631 380/37 |
| 8,615,651 | B1 | 12/2013 | Modadugu et al. |
| 9,853,811 | B1 | 12/2017 | Levy et al. |
| 9,979,625 | B2 | 5/2018 | McLaughlin et al. |
| 10,333,903 | B1 | 6/2019 | Campagna et al. |
| 10,419,930 | B2 | 9/2019 | Holland et al. |
| 10,439,806 | B2 | 10/2019 | Fu et al. |
| 10,491,383 | B2 | 11/2019 | Fu et al. |
| 10,587,400 | B2 | 3/2020 | Zimmerman et al. |
| 10,735,467 | B2 | 8/2020 | Yang et al. |
| 11,032,069 | B2 | 6/2021 | Michael |
| 11,218,471 | B1 | 1/2022 | Stapleton et al. |
| 2003/0139136 | A1 | 7/2003 | Pattabiraman |
| 2005/0021945 | A1 | 1/2005 | Niemi et al. |
| 2008/0031138 | A1 | 2/2008 | Okamasu et al. |
| 2009/0009746 | A1 | 4/2009 | Sugitani et al. |
| 2009/0097467 | A1 | 4/2009 | Sugitani et al. |
| 2012/0224608 | A1 | 9/2012 | Yun et al. |
| 2013/0290733 | A1 | 10/2013 | Branton et al. |
| 2014/0010196 | A1 | 1/2014 | Shapira |
| 2014/0133656 | A1* | 5/2014 | Wurster ................ H04W 4/023 380/270 |
| 2014/0301546 | A1* | 10/2014 | Chevallier-Mames ............ H04L 9/0637 380/28 |
| 2015/0295903 | A1* | 10/2015 | Yi ........................ H04L 63/0457 713/153 |
| 2015/0365424 | A1 | 12/2015 | Pelletier |
| 2016/0080144 | A1* | 3/2016 | Choi ..................... H04L 9/0637 380/44 |
| 2016/0087797 | A1 | 3/2016 | Barbir et al. |
| 2016/0142205 | A1 | 5/2016 | Mohan et al. |
| 2016/0294802 | A1 | 10/2016 | Xiao et al. |
| 2016/0359551 | A1* | 12/2016 | Roy ........................ H04B 7/2041 |
| 2016/0381572 | A1 | 12/2016 | Shahar et al. |
| 2017/0063975 | A1 | 3/2017 | Prakash et al. |
| 2017/0083459 | A1* | 3/2017 | Riou ..................... H01L 23/573 |
| 2017/0111173 | A1 | 4/2017 | Sugitani |
| 2018/0159843 | A1 | 6/2018 | Sajja et al. |
| 2018/0309580 | A1 | 10/2018 | Jeon et al. |
| 2019/0229901 | A1* | 7/2019 | Elbaz ........................ H04L 9/14 |
| 2019/0023839 | A1 | 8/2019 | Rentschler et al. |
| 2019/0238397 | A1 | 8/2019 | Rentschiler et al. |
| 2019/0032039 | A1 | 10/2019 | Wong et al. |
| 2019/0320395 | A1 | 10/2019 | Wong et al. |
| 2020/0127840 | A1* | 4/2020 | Rule ................... H04W 12/108 |

OTHER PUBLICATIONS

Office Action for corresponding patent application U.S. Appl. No. 16/600,977, U.S Patent and Trademark Office, dated Dec. 22, 2020.
Office Action for corresponding U.S. Appl. No. 16/600,959 dated Apr. 21, 2021.
Wolberg, Dan et al. "Simulative Performance Analysis of IO-Link Wireless" 2018 IEEE Workshop on Factory Comm Systems Jun. 13-15, 2018 (Year: 2018).
IO-Link Wireless System Extensions Specifications Ver 1.1 Mar. 2018 Downloaded from http://www.io-link.com (Year: 2018).
Notice of Allowance for corresponding U.S. Appl. No. 16/600,977 dated Apr. 13, 2021.
Notice of Allowance for corresponding U.S. Appl. No. 16/600,937 dated Jun. 28, 2021.
Heynicke et al., "IO-Link Wireless Enhanced Factory Automation Communication for Industry 4.0 Applications" Journal of Sensor Systems, Mar. 6, 2018.
Heynicke et al., "IO-Link Wireless Enhanced Sensors and Actuators for Industry 4.0 Networks", AMA Conferences 2017—SENSOR 2017 and IRS2 2017.

* cited by examiner

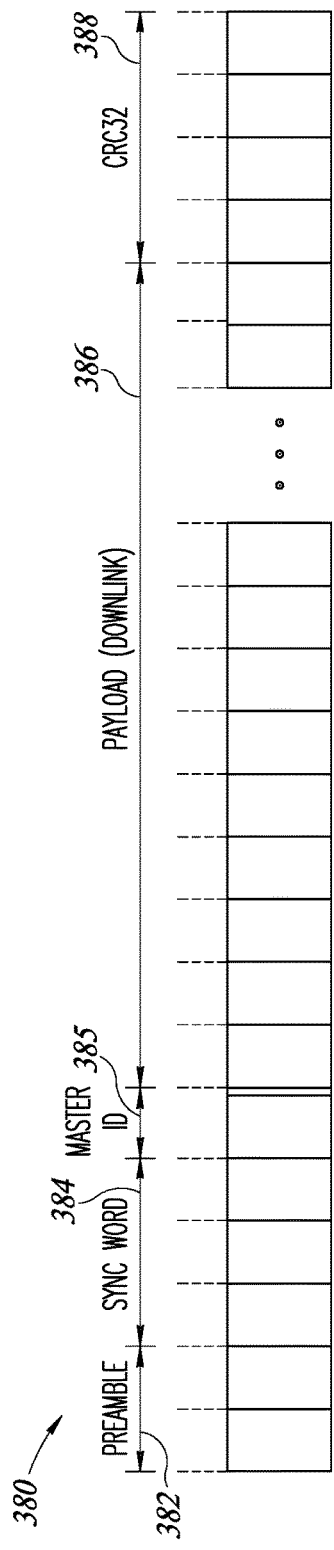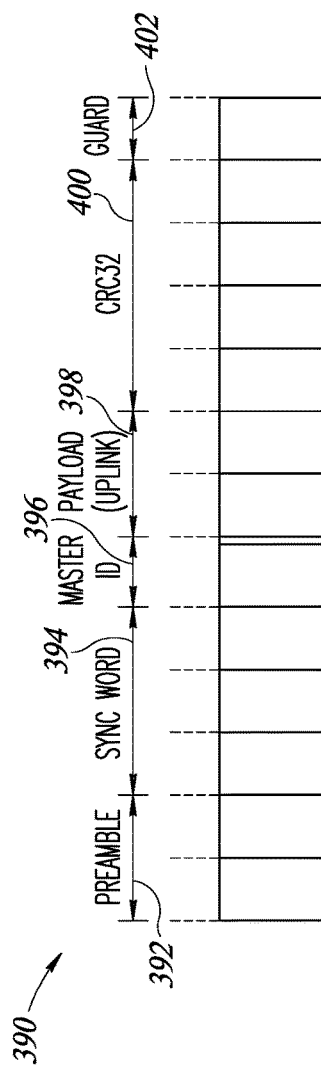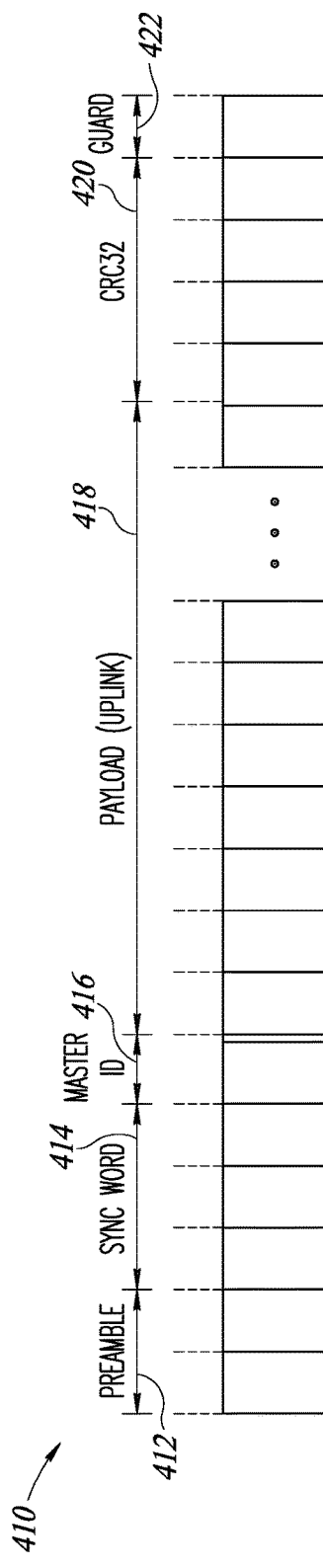

SECURE COMMUNICATION ENCRYPTION AND DECRYPTION MECHANISM IN A WIRELESS COMMUNICATION SYSTEM

REFERENCE TO PRIORITY APPLICATIONS

This application claims the benefit of U.S. Provisional Application No. 62/807,874, filed Feb. 20, 2019, entitled "Encryption For Critical Mission Wireless Communication Link" and U.S. Provisional Application No. 62/850,766, filed May 21, 2019, entitled "Secure Pairing For Critical Mission Wireless Communication Link," both of which are incorporated herein by reference in their entirety.

FIELD OF THE DISCLOSURE

The subject matter disclosed herein relates to the field of data communications and more particularly relates to a system and method of secure communications encryption/decryption for use in a wireless communication system such as IO-Link Wireless.

BACKGROUND OF THE INVENTION

Mission critical wireless link (MCWL) communications requires wireless communications standards that ensure the highest available reliability of wireless communications (e.g., low packet error rate, minimal undetected error rates, etc.), coupled with low and bounded latency in the various protocol layers. An example of such systems are industrial and production plants that employ a large number of connected devices and require MCWL communication to produce the desired products.

Industrial systems include a variety of components, including a multitude of sensors and actuators that are implemented to execute various automated tasks in order to produce a desired product or carry out a specific process. Each individual industrial component is typically either controlled or communicated with. For example, a controlled component such as an actuator is instructed to move a robotic arm in a particular manner. A sensor, for example, is communicated with when a sensor value reading is required to adjust a process accordingly.

Historically, industrial systems used direct individual connections, such as cables running between a controller, such as a programmable logic controller (PLC), and each component of a system. This setup was costly and produced many inefficiencies as it required a multitude of controllers even for a single machine having multiple components. The control signal was transmitted using an analog or a digital signal over the individual cables. While simple in theory, such a setup requires high maintenance, high setup cost, and significant amounts of time for the configuration and setup of each component of a system.

The next evolution of automated industrial systems included a critical mission link system with a master device (i.e. the "master") connected to a controller and configured to communicate with multiple industrial components (i.e. slaves or "devices"). The master offers a more centralized approach, with a single master connected to many components. A standardized protocol, such as the IO-Link® protocol, is an example implementation of such a system. A master is configured to connect to multiple devices, which may be easily connected to actuators, sensors, and the like. The sensors may include smart sensors that are able to provide valuable diagnostic information as well as updated status reports. The devices are configured with plug and play functionality, allowing for the seamless recognition of newly added components.

This scheme, however, retains a number of drawbacks of the previous systems, most notably the requirement of physical cables running from a controller to each component of the system. The setup of such wiring is expensive and time consuming and can be limiting in many industrial applications. For example, running cables in a sealed clean room used in many industries can be awkward and compromise the sealed nature of the room. Further, certain mobile systems that require automated vehicles, e.g., robots configured to move stock or equipment around a warehouse, would be heavily encumbered by requiring a physical cable attached to each vehicle.

With the onset of the Industry 4.0 (i.e. Industrial IoT) evolution, communication needs are changing rapidly. Machine-to-machine (M2M) communication such as connected robots, warehouse automation, and factory processing machinery are becoming more and more prevalent and demanding higher availability, better robustness, lower latency, and deterministic patterns. In this evolution, cable based communication simply cannot fulfil the requirements demanded by the tremendous increase in connected devices in terms of flexibility, mobility, and monitoring.

IO-Link is a short distance, bidirectional, digital, point-to-point, wired or wireless industrial communications networking standard (IEC 61131-9) used for connecting digital sensors and actuators to either a type of industrial fieldbus or a type of industrial Ethernet. It provides a technological platform that enables the development and use of sensors and actuators that can produce and consume enriched sets of data that in turn can be used for economically optimizing industrial automated processes and operations.

In response to these concerns, a critical mission wireless link (CMWL) system has been developed to implement a critical mission link system over wireless communication, obviating the need for cumbersome wires. The IO-Link® Wireless (IOLW) specification is an example of a critical mission link system between a master and one or more devices, and describes a time division multiplexing (TDM) uplink network configured to communicate with multiple devices.

IO-Link Wireless defines wireless network communication between sensors, actuators and controllers (PLC) in the factory automation environment. It was designed to provide a similar level of performance and backward compatible interface as with cables (IO-Link wired) so that the migration from wired to wireless systems is made easy. IO-Link Wireless provides deterministic minimal latency of 5 msec communication with 40 nodes which may be sensors or actuators. It presents reliability that is better than $10^{-9}$ packet error rate (PER) in ideal cases. In comparison, other wireless standards such as WLAN, Bluetooth, and Zigbee have PERs that are six orders of magnitude less reliable (e.g., $10^{-3}$) in industrial environments.

Within networks such as IO-Link, it is necessary to ensure accurate and efficient delivery of process data, e.g., critical cycle data, between paired devices and the master, i.e. between the actuators and sensors of the system and the master. The system often operates over the 2.4 GHz industrial, scientific, and medical (ISM) radio band, which is also used for many common wireless devices, including wireless routers, monitors, cordless telephones, and the like.

The wireless communications sent over the current IO-Link Wireless implementation is not encrypted and the master and devices are not securely paired, thus opening up communications to malicious attacks. Examples of such attacks include eavesdropping, man-in-the-middle attacks, spoofing, and other hacking attempts. While many encryption services are available in general, implementing them within such a system efficiently is challenging.

Any latency introduced into the network may cause unacceptable lags in communication, which may produce errors as well as safety concerns within the industrial system controlled by the IO-Link Wireless communications. Many systems that implement such protocols require elevated security to ensure not only protection from malicious actors, but highly reliable connections to ensure the internal safety of the industrial operation is fully reliable and not compromised. Further, secure pairing between a master and one or more devices must be not only efficient, but sufficiently robust to withstand unplanned circumstances, such as maintaining pairing abilities even after a power outage or other event that disrupts communications between the master and devices.

There is a thus a need for a secure and encrypted wireless IO-Link Wireless implementation with secure pairing and secure key exchange to provide efficient and optimal performance that overcomes the problems and challenges described supra.

SUMMARY OF THE INVENTION

The present invention is a mechanism for providing security features to a wireless communications system that otherwise does not have such features. The invention is applicable in wireless communication systems such as IO-Link Wireless but is applicable to other wireless systems as well. Security features including encryption and decryption of communications, including secure key exchange, secure pairing, and secure re-pairing are provided. The security features are able to thwart several security vulnerabilities including eavesdropping, man in the middle attacks, replay, spoofing, tampering, etc.

In one embodiment, the encryption/decryption mechanism uses AES-256 block cypher with counter mode to generate blocks of cypher bits that are used to encrypt and decrypt communications between the master and devices. An optional nonce and counter value are input to the AES-256 block cypher along with a shared session key that was mutually derived on both the master and devices. Session keys are generated using a random salt and a shared permanent key (device or random key). The random salt is generated using a secure random number generator such as the well-known CSPRNG algorithms. A master key (or device key) is also used in generating session keys. Session keys are not permanent and are used to encrypt/decrypt only a finite amount of data. Once exhausted, the session key is replaced by a new one and cypher bits are generated using the new session key. A synchronized key jump procedure ensures that the master and device switch to the new session key at the same time.

The mechanism of the invention is useful to improve wireless transmission performance in industrial environments, and in particular, in IO-Link Wireless networks. The mechanisms of the present invention are particularly useful in wireless networks such those operating under the IO-Link Wireless standard. The description of the invention is provided in the context of the IO-Link Wireless standard. It is appreciated, however, that the mechanisms of the invention are applicable to other wireless networks as well.

There is thus provided in accordance with the invention, a method of secure communications between a master and a plurality of devices in a wireless communications network, the method comprising encrypting, on the master, downlink plaintext for multicast transmission to a plurality of devices over a wireless communications link utilizing a symmetric key encryption algorithm in accordance with a first counter value and a shared symmetric session key, and decrypting, on one of the devices, multicast downlink cyphertext received from the master over the wireless communications link utilizing a symmetric key decryption algorithm in accordance with a second counter value and the shared symmetric session key.

There is also provided in accordance with the invention, a method of secure communications between a plurality of devices and a master in a wireless communications network, the method comprising encrypting uplink plaintext for unicast transmission to the master over a wireless communications link utilizing a symmetric key encryption algorithm in accordance with a first counter value and a shared symmetric session key, and decrypting unicast uplink cyphertext received from one of the devices over the wireless communications link utilizing a symmetric key decryption algorithm in accordance with a second counter value and the shared symmetric session key.

There is further provided in accordance with the invention, a method of secure communications between a master and a plurality of devices in a wireless communications network, the method comprising encrypting downlink plaintext for multicast transmission to a plurality of devices over a wireless communications link utilizing a symmetric key encryption algorithm in accordance with a first counter value and a first symmetric session key, and decrypting unicast uplink cyphertext received from each device over the wireless communications link utilizing a symmetric key decryption algorithm in accordance with a second counter value and a second symmetric session key.

There is also provided in accordance with the invention, a method of secure communications between a plurality of devices and a master in a wireless communications network, the method comprising encrypting uplink plaintext for unicast transmission to the master over a wireless communications link utilizing a symmetric key encryption algorithm in accordance with a first nonce, a first counter value, and a first symmetric session key, and decrypting multicast downlink cyphertext received from the master over the wireless communications link utilizing a symmetric key decryption algorithm in accordance with a second nonce, a second counter value, and a second symmetric session key.

There is further provided in accordance with the invention, an apparatus for secure communications between a master and a plurality of devices in a wireless communications network, comprising a frequency hopping radio transmitter, a frequency hopping radio receiver, a processor coupled to and operative to control the frequency hopping radio transmitter and the frequency hopping radio receiver, the processor programmed to encrypt downlink plaintext for multicast transmission to a plurality of devices over a wireless communications link utilizing a symmetric key encryption algorithm in accordance with a first nonce, a first counter value, and a first symmetric session key, and decrypt unicast uplink cyphertext received from each device over the wireless communications link utilizing a symmetric key decryption algorithm in accordance with a second nonce, a second counter value, and a second symmetric session key.

There is also provided in accordance with the invention, an apparatus for secure communications between a plurality of devices and a master in a wireless communications network, comprising a frequency hopping radio transmitter, a frequency hopping radio receiver, a processor coupled to and operative to control the frequency hopping radio transmitter and the frequency hopping radio receiver, the processor programmed to encrypt uplink plaintext for unicast transmission to the master over a wireless communications link utilizing a symmetric key encryption algorithm in accordance with a first nonce, a first counter value, and a first symmetric session key, and decrypt multicast downlink cyphertext received from the master over the wireless communications link utilizing a symmetric key decryption algorithm in accordance with a second nonce, a second counter value, and a second symmetric session key.

This summary is provided to introduce a selection of concepts in a simplified form that are further described below in the Detailed Description section. This Summary is not intended to identify key features or essential features of the claimed subject matter, nor is it intended to be used as an aid in determining the scope of the claimed subject matter.

BRIEF DESCRIPTION OF THE DRAWINGS

The present invention is explained in further detail in the following exemplary embodiments and with reference to the figures, where identical or similar elements may be partly indicated by the same or similar reference numerals, and the features of various exemplary embodiments being combinable. The invention is herein described, by way of example only, with reference to the accompanying drawings, wherein:

FIG. 17 is a diagram illustrating an example downlink packet structure in more detail;

FIG. 18 is a diagram illustrating an example short uplink packet structure in more detail;

FIG. 19 is a diagram illustrating an example long uplink packet structure in more detail;

DETAILED DESCRIPTION

Figure 1:
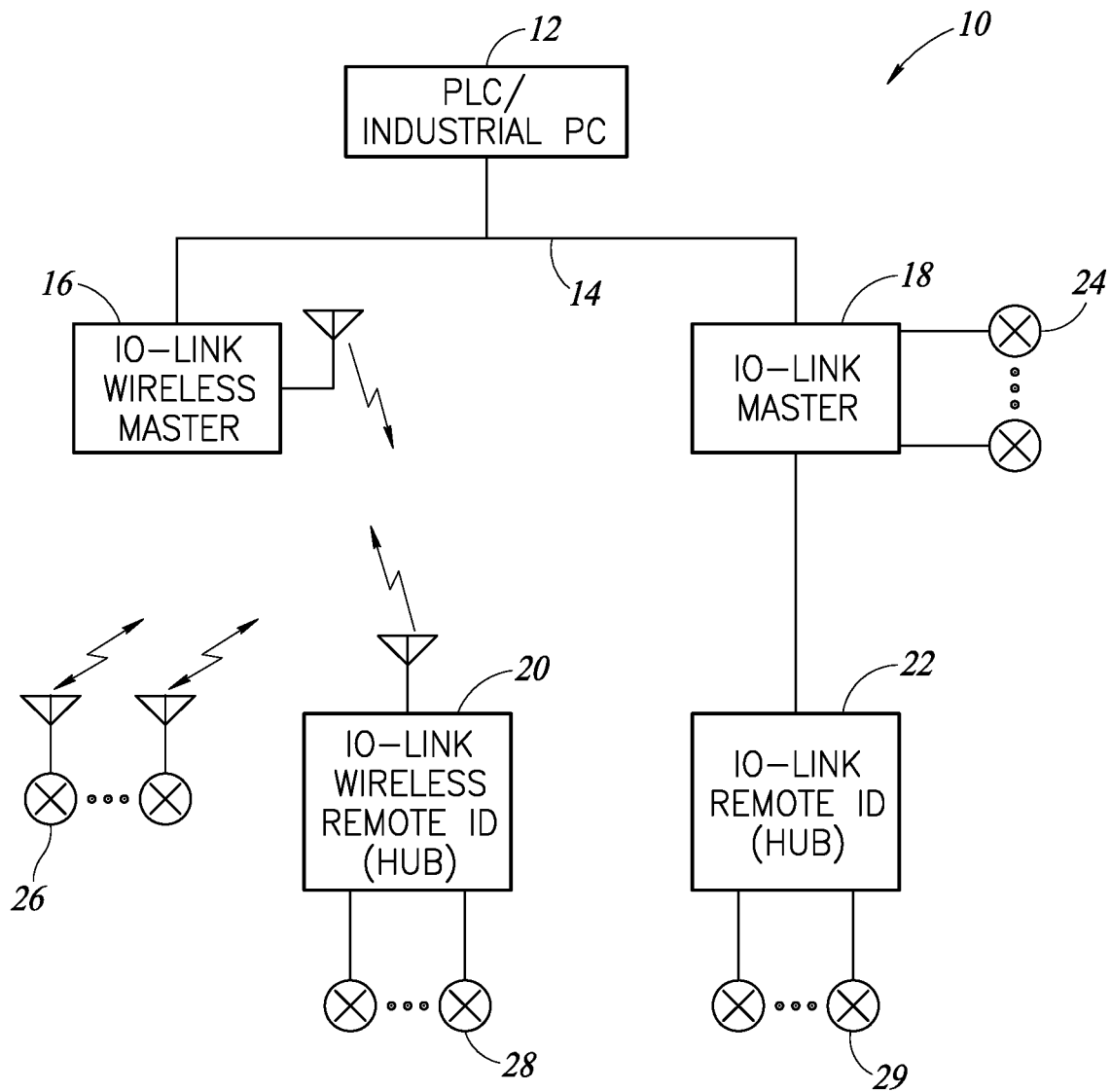
FIG. 1 is a high level block diagram illustrating an example IO-Link system including wired and wireless components.

In the following detailed description, numerous specific details are set forth in order to provide a thorough understanding of the invention. It will be understood by those skilled in the art, however, that the present invention may be practiced without these specific details. In other instances, well-known methods, procedures, and components have not been described in detail so as not to obscure the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary, for the understanding and appreciation of the underlying concepts of the present invention and in order not to obfuscate or distract from the teachings of the present invention.

Any reference in the specification to a method should be applied mutatis mutandis to a system capable of executing the method. Any reference in the specification to a system should be applied mutatis mutandis to a method that may be executed by the system.

Throughout the specification and claims, the following terms take the meanings explicitly associated herein, unless the context clearly dictates otherwise. The phrases "in one embodiment," "in an example embodiment," and "in some embodiments" as used herein do not necessarily refer to the same embodiment(s), though it may. Furthermore, the phrases "in another embodiment," "in an alternative embodiment," and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As will be appreciated by one skilled in the art, the present invention may be embodied as a system, method, computer program product or any combination thereof. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

The term "secure hash algorithm" (SHA), SHA2, SHA3, etc. are secure hash algorithms that are members of the secure hash algorithm family of standards released by the National Institute of Standards And Technology (NIST) in 2015. SHA and SHA3 in particular is resilient against length extension attacks and is often used for signature and key derivation algorithms.

A "key derivation algorithm" uses a secret master or device key, a randomly generated and publicly known plaintext transmitted password (i.e. salt or nonce) to generate a strengthened shared secret key to be used for a short period of time (henceforth "session key"). The algorithm, which derives the secret key, uses a one-way key derivation function such as SHA.

"Key exchange" algorithms are used to securely cryptographically exchange keys using a cryptographic algorithm. A "key agreement" protocol is one that allows two or more parties to agree on a key in such a way that both influence the outcome. Properly performed, this precludes a third party from forcing a key of choice on the communication parties as well as discovery of the key.

An example algorithm that can be used for secure "key exchange" is the Elliptic Curve Diffie Hellman (ECDH) algorithm. This well-known anonymous key agreement protocol uses the discrete logarithm problem over elliptic curves and is commonly used to generate session keys.

The Advanced Encryption Standard (AES) is a specification for the encryption of electronic data established by the NIST in 2001. This has been adopted by the U.S. government and is now used worldwide. AES-256 is a block cypher and has a fixed length of 128 bits with a key of size 256 bits. In some applications pure block cyphers are not acceptable due to their latency and their inability to parallelize the encryption or decryption operations with other operations such as receiving or transmitting encrypted data. Another disadvantage of pure block cyphers is their requirement of a fixed message length and therefore require modification such as concatenation or padding for messages of various lengths.

A method which circumvents these shortcomings is the counter mode of operation suggested by Diffie and Hellman in 1979. The counter mode turns a block cypher into a stream cypher allowing both parallelization of operations and messages of variable lengths.

A "cryptographically secure pseudo-random number generator" (CSPRNG) is a pseudo-random number generator (PRNG) with properties that make it suitable for use in cryptography. Many cryptographic applications require the generation of random numbers to be maintain secrecy. Such applications include key generation, nonce, one time pads and salts. The quality of the randomness required for these applications varies. For example, creating a nonce in some protocols needs only uniqueness. On the other hand, generation of a master key requires a higher quality, such as more entropy.

Ideally, the generation of random numbers in CSPRNGs uses entropy obtained from a high-quality source, generally the operating system's randomness API. Unexpected correlations, however, have been found in several such ostensibly independent processes. From an information-theoretic point of view, the amount of randomness, the entropy that can be generated, is equal to the entropy provided by the system. Sometimes, however, more random numbers are needed than there is entropy available. In addition, the processes to extract randomness from a running system are relatively slow in actual practice. In such instances, a CSPRNG can sometimes be used. A CSPRNG can stretch the available entropy over more bits.

A "nonce" is defined as an arbitrary (i.e. random) number used in cryptographic communications. It may be used once or stored and used as a constant repeatedly in encryption/decryption operations. The nonce may comprise a random or pseudo-random number.

Throughout this document, the term "password" and "key" are intended to be interchangeable. Keys may have a particular number of bits, 128, 256, etc.

In one embodiment, keys that are permanent are randomly generated and may have any desired length, e.g., 128, 256, etc. In one embodiment, salts are randomly generated and may have any desired length, e.g., 128, 256, etc.

In one embodiment, ephemeral (i.e. temporary) session keys and session passwords are derived from a permanent key and may have any desired length, e.g., 128, 256, etc. In addition, they may also be derived from a salt as well as a permanent key.

In one embodiment, the one way SHA algorithm used is the SHA2 or SHA3 algorithm having any desired length, e.g., 128, 192, 256, etc. that generates a message digest from an arbitrary message.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device.

Computer program code for carrying out operations of the present invention may be written in any combination of one or more programming languages, including an object oriented programming language such as Java, Smalltalk, C++, C# or the like, conventional procedural programming languages, such as the "C" programming language, and functional programming languages such as Prolog and Lisp, machine code, assembler or any other suitable programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network using any type of network protocol, including for example a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented or supported by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The invention is operational with numerous general purpose or special purpose computing system environments or configurations. Examples of well-known computing systems, environments, and/or configurations that may be suitable for use with the invention include, but are not limited to, personal computers, server computers, cloud computing, hand-held or laptop devices, multiprocessor systems, microprocessor, microcontroller or microcomputer based systems, set top boxes, programmable consumer electronics, ASIC or FPGA core, DSP core, network PCs, minicomputers, mainframe computers, distributed computing environments that include any of the above systems or devices, and the like.

In addition, the invention is operational in systems incorporating sensors such as found in automated factories, in mobile devices such as tablets and smartphones, smart meters installed in the power grid and control systems for robot networks. In general, any computation device that can host a master and/or device can be used to implement the present invention.

A high level block diagram illustrating an example IO-Link system including wired and wireless components is shown in FIG. 1. The example system, generally referenced 10, comprises a programmable logic controller (PLC) or industrial PC 12 coupled to an IO-Link master 18 and IO-Link Wireless master 16. The wireless master can be coupled wirelessly to a plurality of devices 26, and/or a wireless remote ID hub 20 which couples a number of remote devices 28 to the network. The wired master 18 couples a plurality of devices 24 to the network and may be coupled to a remote ID hub 22 which couples a number of remote devices 29 to the network.

It is appreciated that although the invention is described in the context of the IO-Link standard, the mechanism described here are applicable to other wireless systems as well. It is not intended that the invention be limited to the IO-Link standard example described herein.

Industrial systems use direct individual connections between a controller, e.g., PLC, and each component of the system. The control signal is transmitted using an analog or a digital signal sent over individual cables. A critical mission link system has a master 16, 18 connected to the PLC 12 and configured to communicate with multiple industrial devices (i.e. components) 24, 26, 28, 29. Typically, the master is configured to connect to multiple devices, such as actuators, sensors, and the like. The sensors may include smart sensors that are able to provide valuable diagnostic information as well as updated status reports. The master provides a centralized approach, with a single master connected to many components.

A standardized protocol, such as IO-Link®, is an example of such a system. The wireless IO-Link® (IOLW) standard, serving as a critical mission wireless link (CMWL) system, has been developed. The IOLW standard implements a critical mission link system over wireless communication, obviating the need for wires. The IOLW standard defines a time division multiplexing (TDM) uplink network configured to communicate with multiple devices. The master downlink comprises a broadcast message (i.e. one message sent for all devices) while multiple devices and components use a synchronous (i.e. by an external clock) TDM mechanism for uplink.

Figure 2:
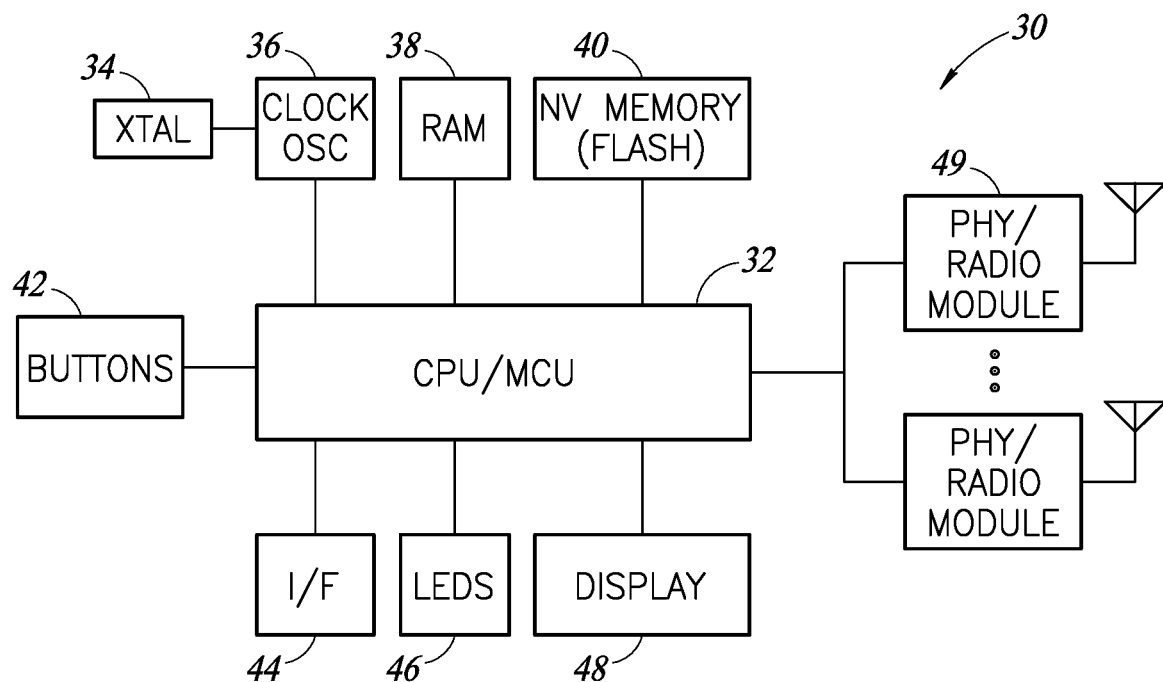
FIG. 2 is a high level block diagram illustrating an example master.

A high level block diagram illustrating an example master is shown in FIG. 2. The master, generally referenced 30, comprises a central processing unit (CPU)/microcontroller unit (MPU) 32, volatile memory, e.g., RAM, 38, non-volatile memory, e.g., Flash, 40, crystal 34, clock oscillator 36, display 48, LEDs 46, interface 44, one or more buttons 42, and a plurality of PHY/radio modules 49.

Figure 3:
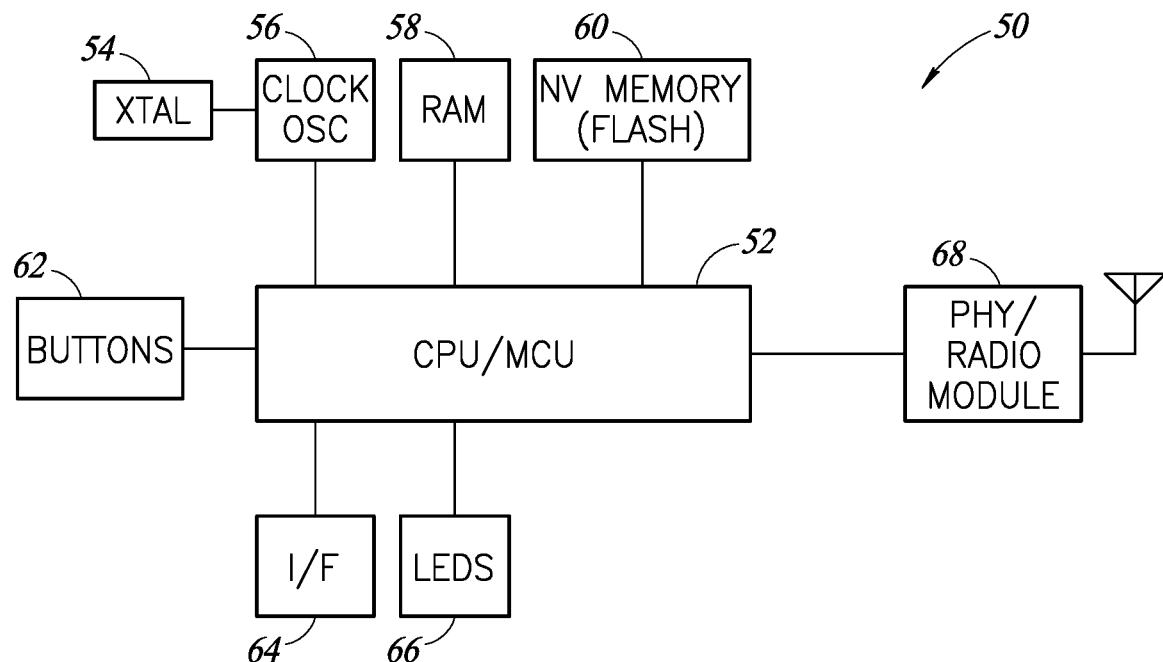
FIG. 3 is a high level block diagram illustrating an example device.

A high level block diagram illustrating an example device is shown in FIG. 3. The device, generally referenced 50, comprises a central processing unit (CPU)/microcontroller unit (MPU) 52, volatile memory, e.g., RAM, 58, non-volatile memory, e.g., Flash, 60, crystal 54, clock oscillator 56, LEDs 66, interface 64, one or more buttons 62, and PHY/radio module 68.

Figure 4:
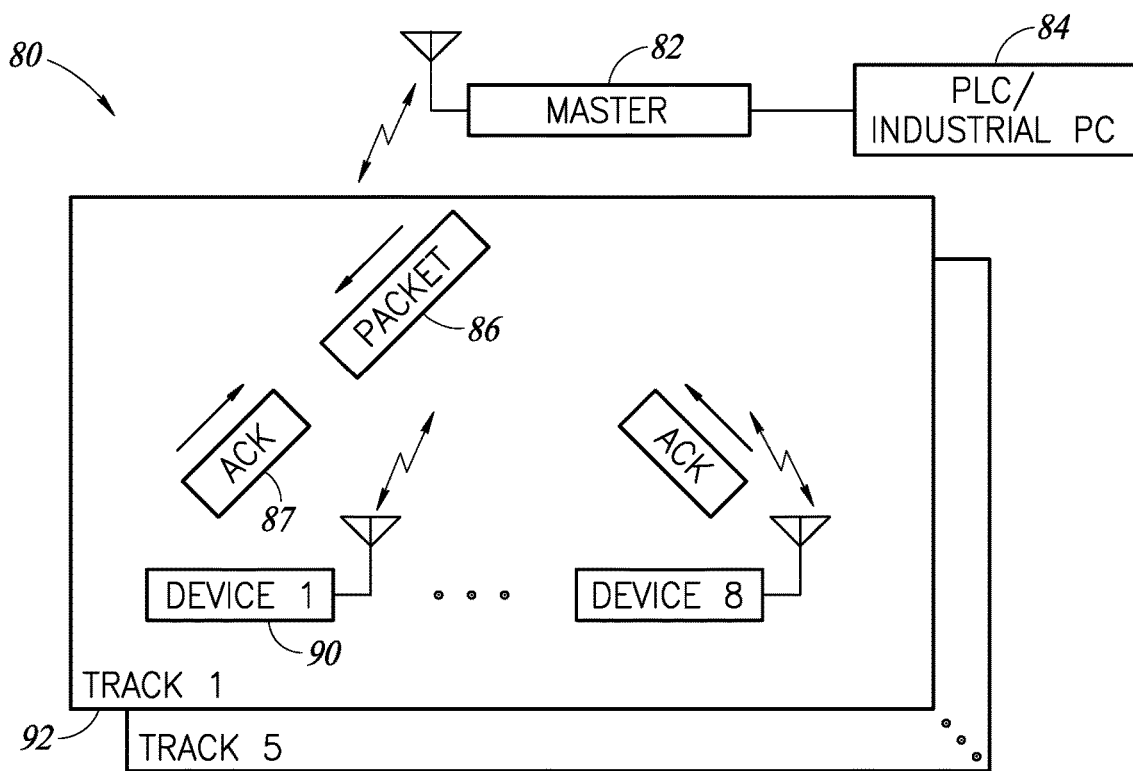
FIG. 4 is a diagram illustrating example communications between a master and several devices.

A diagram illustrating example communications between a master and several devices is shown in FIG. 4. The system, generally referenced 80, comprises a master 82 coupled to a PLC/industrial PC 84 and in communication with a plurality of devices 90 divided into multiple tracks 92. In the IO-Link Wireless system, each master may communicate with up to five tracks of devices, where each track has up to eight devices. Devices and masters transmit packets 86 between each other over downlinks and uplinks. An acknowledgement (ACK) negative acknowledgement (NACK) is generated and sent for each packet. Note that the master has a radio per track (i.e. up to five), each radio used to communicate over one of the tracks.

In operation, the master communicates with the devices over multiple tracks. Each track operates in a star topology, i.e. one master to many devices. The master comprises one dedicated transceiver (not shown) per track (for a total of five) and each device has a dedicated transceiver (not shown). While the master supports multiple tracks, the devices are limited to a single track. The tracks run simultaneously and are generally separated by frequency division multiplexing (FDM) frequency tables, defined a priori. For uplink communications from the devices to the master, each track operates its own TDM scheme while hopping a unique frequency table. When any of devices sends a unicast uplink message, the master is configured to receive and process the message. For downlink communications, the master communicates with the devices via multicast messaging. At a given time as defined by the standard, all device transceivers are configured to receive the multicast message transmitted by the master transceiver (per track).

Figure 5:
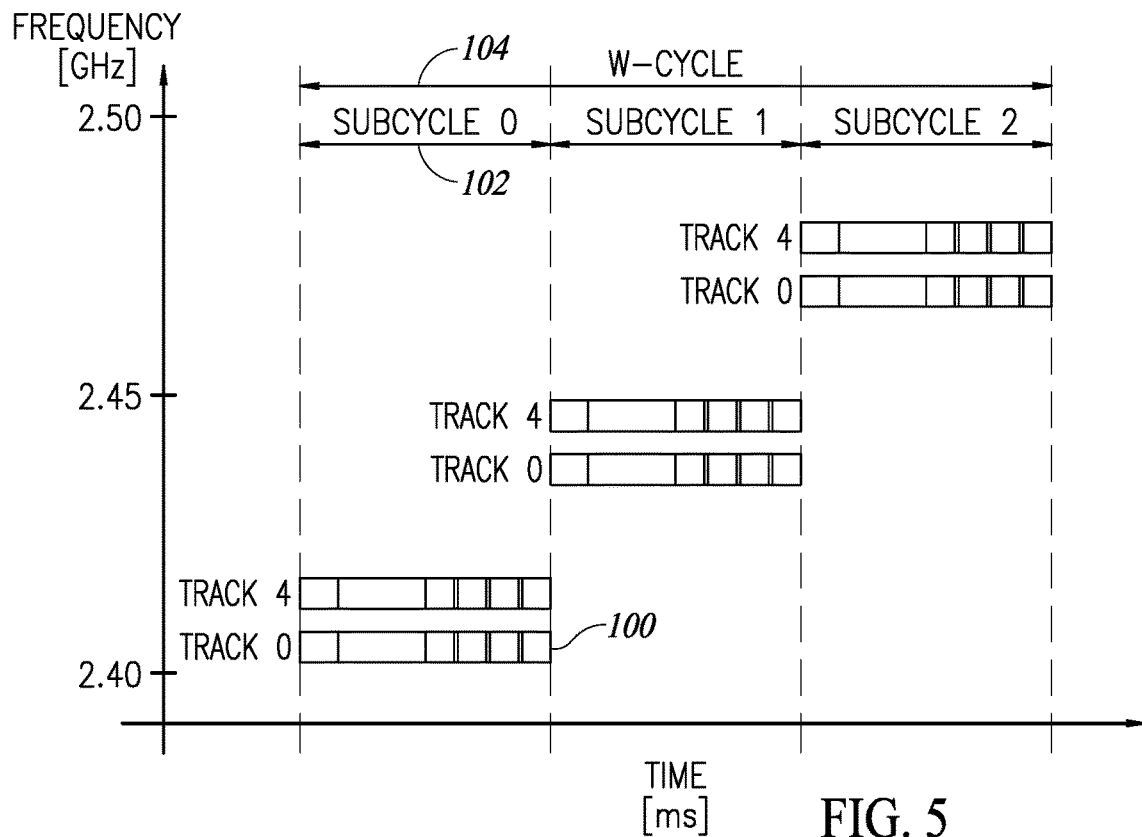
FIG. 5 is a diagram illustrating an example frequency plot for transmissions between master and devices.

A diagram illustrating an example frequency plot for transmissions between master and devices is shown in FIG. 5. The spectrogram shown is the transmission cadence according to the IOLW standard. The x-axis signifies time in msec and the y-axis signifies the frequency in GHz. The spectrum band over which the IOLW standard communicates is the Industrial, Scientific and Medical (ISM) band from 2.4 to 2.5 GHz.

The transmission cadence is divided into cycles (referred to as W-Cycles in the IOLW standard) 104 with varying durations. In this example, each cycle has a length of 5 msec. Each cycle is divided into a plurality of subcycles 102 of fixed duration. In this example, each cycle is divided into three subcycles of 1.66 msec each. Note that cycles may be divided into three or more subcycles.

According to a sequence known a priori to master and devices, each track within each subcycle is assigned a nonoverlapping frequency on which its members transmit and receive. In this example, track 0 and track4 are shown. In the first subcycle 0, track 0 packets 100 are transmitted on frequency 2.404 GHz, while track 4 packets are transmitted on 2.412 GHz. This FDM scheme along with time synchronization between the tracks prevents the tracks from overlapping in the frequency domain and allows simultaneous transmission. Within each track, the various members (i.e. master track and associated devices) obey a TDM regime, in which, only one member transmits at any given time. In subcycle 1, track 0 packets are transmitted at 2.43 GHz and track 4 packets are transmitted at 2.47 GHz. In subcycle 2, track 0 packets are transmitted over the center frequency 2.46 GHz while track 4 packets are transmitted over the center frequency of 2.472 GHz.

Figure 6:
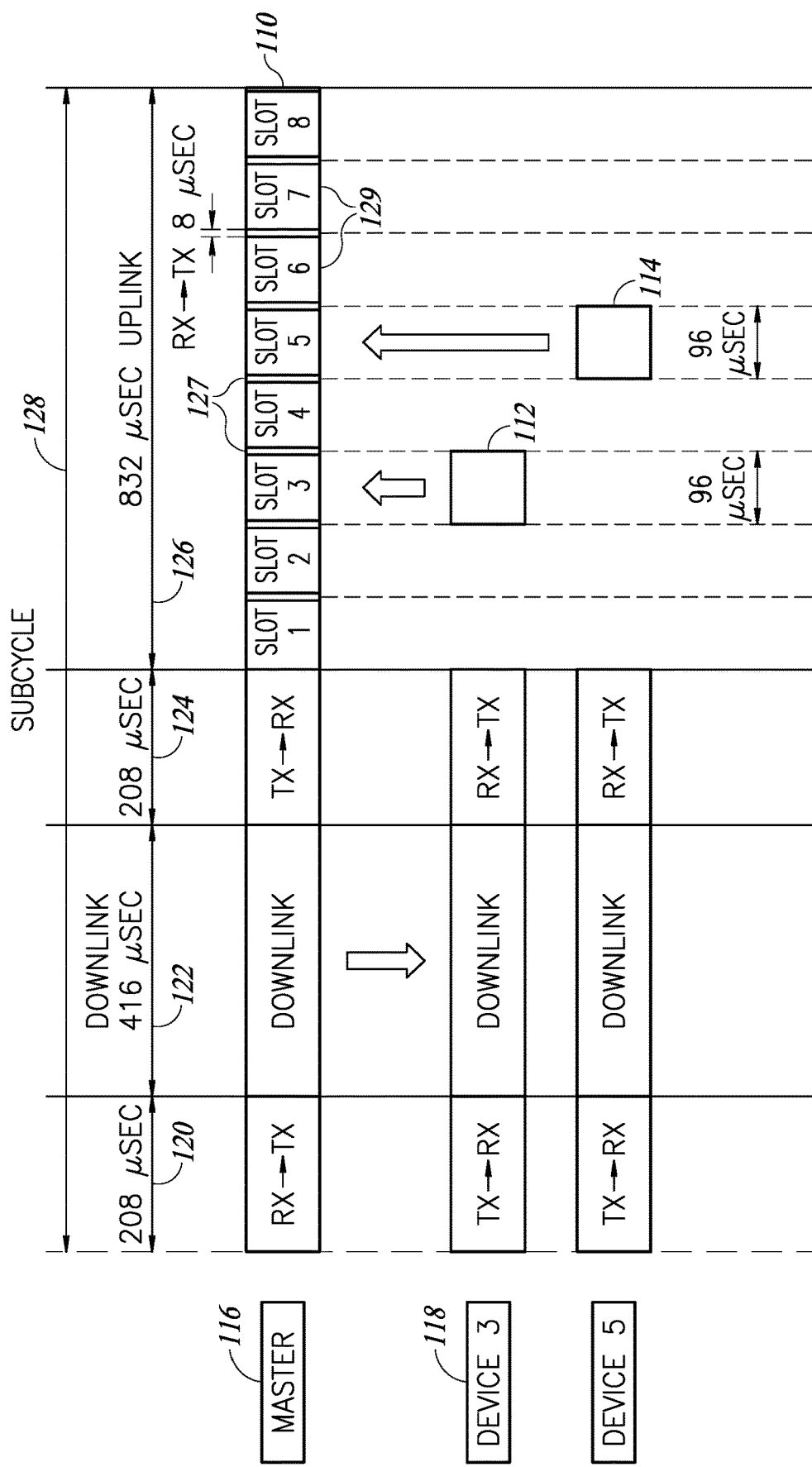
FIG. 6 is a diagram illustrating the TDM scheme in more detail.

A diagram illustrating the packet structure of a single subcycle in the TDM regime in more detail is shown in FIG. 6. The subcycle 128 is a structured transmit receive system between a master 116 and multiple devices 118, e.g., devices 3 and 5, operating over a single track. The subcycle comprises a 208 μsec guard time 120, in which the master switches its transceiver from receive (RX) to transmit (TX) mode (from the previous subcycle) and devices 118 switch their transceivers from TX to RX (from the previous subcycle). This is followed by a 416 μsec downlink window 122, in which the master transmits a downlink multicast message to the devices.

The system then goes into a 208 μsec guard time 124 in which the master switches its transceiver form TX to RX and the devices switch from RX to TX. This is followed by an 832 μsec uplink window 126 during which eight 96 μs consecutive time slots 129 are provided for the devices to transmit their uplink information to the master in messages 112, 114. The slots are padded with 8 μs guard times 127 to allow the master to reset its transceiver and move from RX (last packet) to RX (new packet). Note that the entire subcycle is conducted over a single FDM frequency that hops from subcycle to subcycle.

The IO-Link Wireless (IOLW) standard defines two relevant data types:

1. Cyclic Process Data (PD) which is high priority and the most critical type of data that needs to be sent and received robustly and quickly periodically. For sensors, the PD holds the sensed parameter data. For actuators the PD holds the control information for controlling the actuator.

2. On-Demand Data (OD) which consists of cyclical device data or events. This data is low priority and second in priority to PD.

The IOLW standard defines two scenarios of PD packets. (1) PD-out where PD data is sent from a master to a device (e.g., downlink for actuators), and (2) PD-in where PD data is sent from a device to a master (e.g., uplink for sensors).

Figure 7:
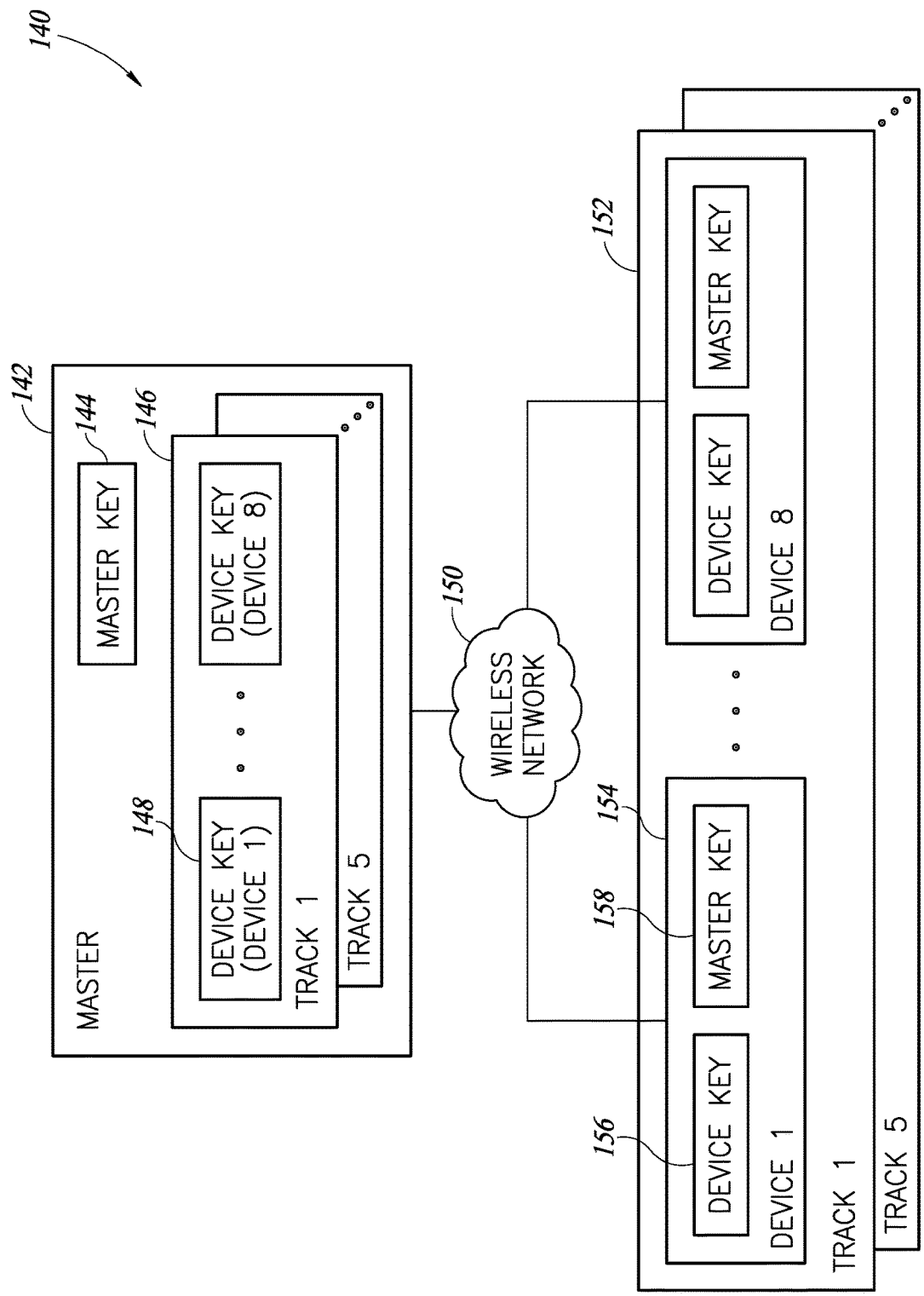
FIG. 7 is a high level block diagram illustrating an example IO-Link system including a master and multiple tracks of devices.
Figure 8:
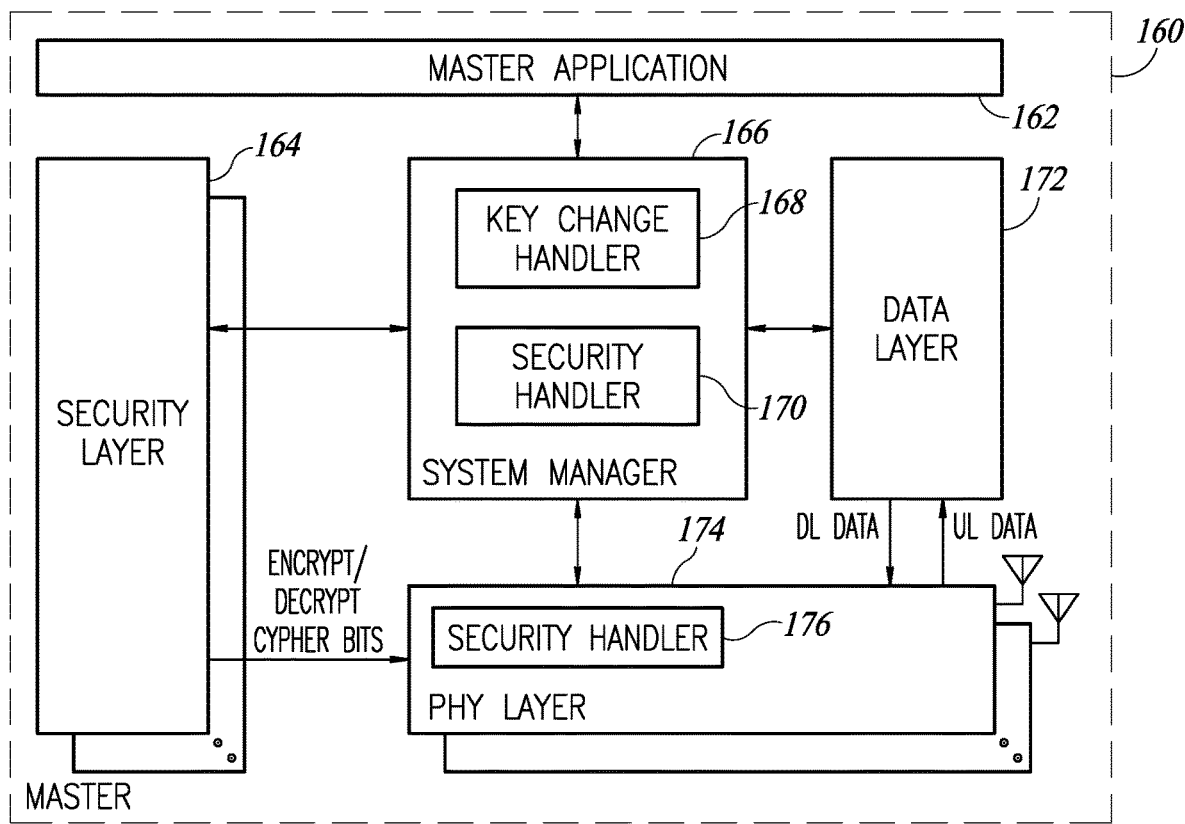
FIG. 8 is a high level block diagram illustrating example security components in a master.

A high level block diagram illustrating an example IO-Link system including a master and multiple tracks of devices is shown in FIG. 7. The system, generally referenced 140, comprises a master 142 and one to five tracks of devices 152. The master is operative to generate and store in memory a master key 144 that is shared with all devices. In addition, device keys 148 generated by each device are received by the master and stored in memory. Note that the generation of the master key and/or the device key on either master and/or device is optional. It is possible that the master and/or device are programmed/provisioned with master/device keys that are generated externally (e.g., on a laptop or other computer).

Up to eight device keys 148 are, stored for each track 146. The master as well as all devices communicate via the wireless communication network 150. Devices 154 are organized into five tracks 152 of up to eight devices in each track for a total of up to 40 devices per system. Note that each track 152 comprises up to eight devices for a total of 40 possible devices in the system. Each device 154 is operative to store and optionally generate a device key 156 that is shared with the master. The shared master key 158 received from the master is also stored in the memory of each device.

Note that in one embodiment, the tracks are independent with regards to their keys/passwords and security configurations. The master is wirelessly connected to up to eight devices. The master is operative to store a single master key (e.g., 256 bits) and eight device keys (e.g., 256 bits) for each track. Each device stores the master key and its own device key. In one embodiment, the master key and device keys are established and exchanged during the pairing period, described in more detail infra. Preferably, these keys are stored in non-volatile RAM such that they are maintained indefinitely.

A high level block diagram illustrating example security components in a master is shown in FIG. 0.8. The master, generally referenced 160, comprises, a master software application 162, one or more security layers 164 (one per track), system manager 166, data layer 172, and one or more PHY layers 174 (e.g., one per track) each comprising security handler 176. The system manager 166 comprises key change handler 168 and security handler 170.

In operation, the master application communicates with the system manager to coordinate the activities of the master. The system manager and security layer communicate as well including initiating session key change, session key jump, updating salt, etc. The cypher bits are requested by the PHY layer and generated by the security layer. In one embodiment, the cypher bits are generated in blocks using a shared session key. The shared session key used has a finite life and is continually being renewed. A new session key is generated when the number of bits encrypted/decrypted reaches a threshold. The security layer is operative to generate new sessions keys before the existing block of cypher bits are exhausted by the PHY layer. The security layer is also responsible for performing secure pairing storing master and device keys, generating private and public keys, etc. Using the cypher bits provided by the security layer, the PHY layer functions to encrypt plaintext downlink data that is then multicast over the wireless link to the devices, as well as decrypt cyphertext received from device to generate plaintext uplink data.

Figure 9:
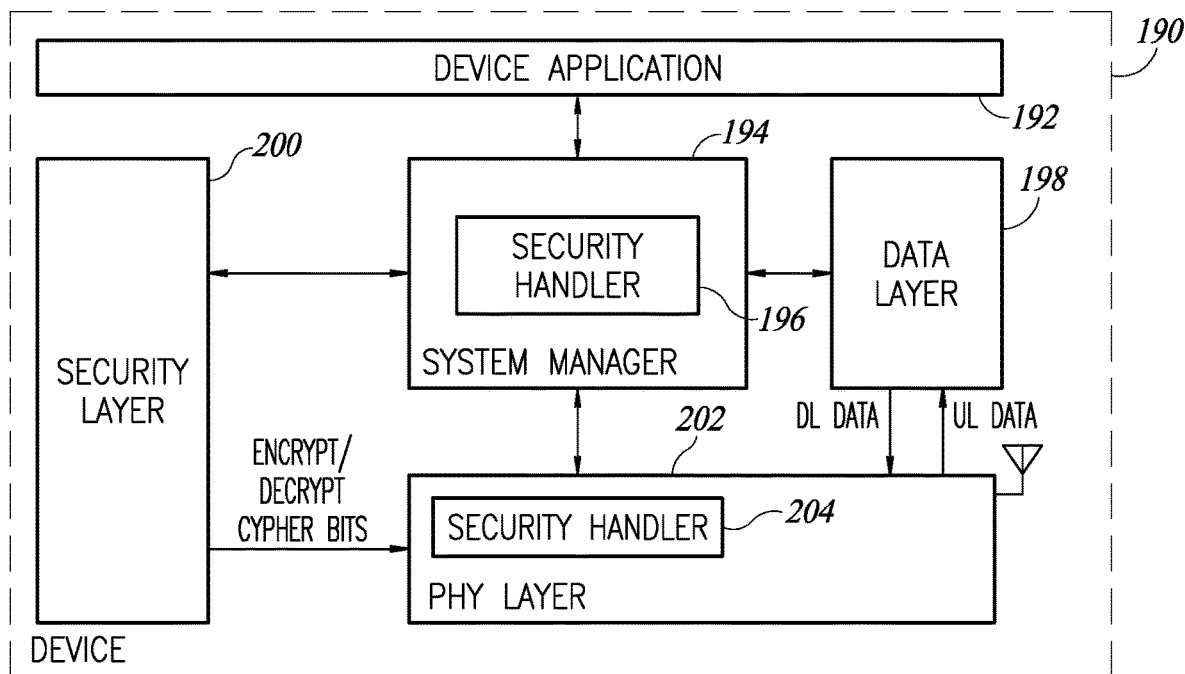
FIG. 9 is a high level block diagram illustrating example security components in a device.

A high level block diagram illustrating example security components in a device is shown in FIG. 9. The device, generally referenced 190, comprises a device software application 192, security layer 200, system manager 194 including security handler 196, data layer 198, and PHY layer 202 comprising security handler 204. Operation of the device is similar to that of the master with the difference being that the only the master generates salts and initiates session key changes. Similar to the master, the cypher bits used in the PHY layer for encryption and decryption are obtained from the security layer upon request. The PHY layer uses the cypher bits to decrypt the downlink cyphertext to generate downlink plaintext as well as to encrypt uplink plaintext that is unicast to the master.

Figures 10, 11:
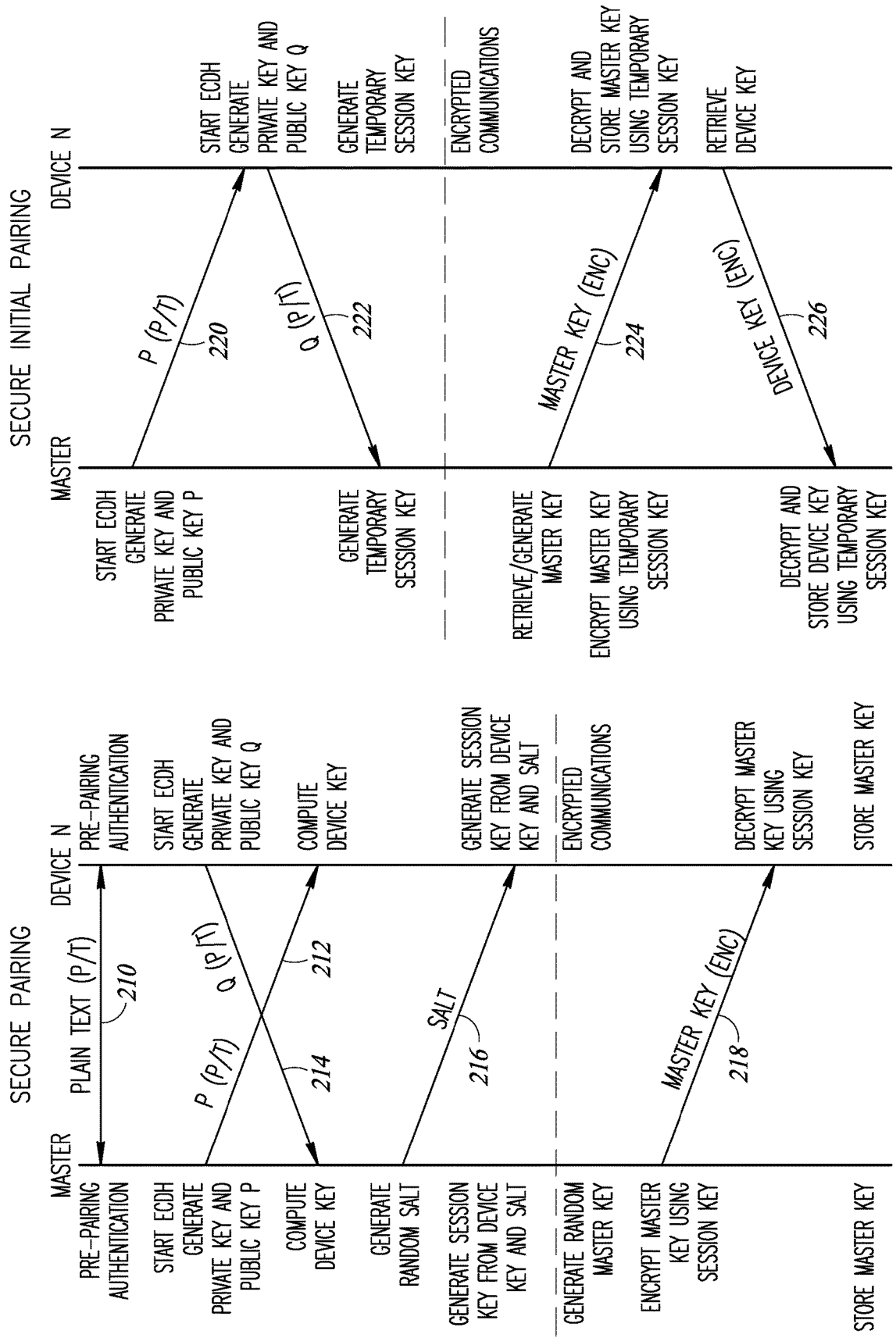
FIG. 10 is a diagram illustrating an example secure pairing mechanism between a master and a device.
FIG. 11 is a diagram illustrating an example secure initial pairing mechanism between a master and a device.

A diagram illustrating an example secure pairing mechanism between a master and a device is shown in FIG. 10. During secure pairing, keys are established using key exchange algorithms. Note that the keys are secure even if eavesdropping occurred during the pairing process. In one embodiment, a master and one or more connected devices within a critical mission wireless link system are configured to establish a secure connection to transmit and receive data. The connection may be established by first sharing public keys over an unencrypted channel, and then using the shared public keys to create a shared secret key for an encrypted channel to allow for secure downlink and uplink communication between the master and the devices.

In one embodiment, three types of keys are used in the secure CMWL system: (1) a session key; a master key; and a device key. A session key is generated (i.e. computed) periodically and used for subsequent encryption/decryption operations until a new session key is generated. The session key is stored in memory and is not required to be retained when the CMWL system restarts. There is one session key for communications between the master and all devices, and a different session key for communications between each device and the master.

The master key is a single key generated during the pairing process of the CMWL system between the master and one or more devices. It is used to generate the session keys for encrypting downlink communications between the master and all devices. The master key is stored in NVM on both the master and all devices. The master key may be provided and configured by the user or operator at system startup rather than generated by the master itself.

The device key for the $n^{th}$ device is generated by the master and device, by the device alone, or provided and configured by the user or operator at system startup. Device keys are stored on both the master and the respective device. The device key is used to a generate session key for uplink communications between a device and the master. It is stored on both the master and the respective device in NVM.

The secure pairing process between the master and the devices is an asymmetric process during which the device key is generated securely and stored, and the master key is transmitted in a secure encrypted fashion and then stored. When the secure pairing process is complete, both the master and the devices have the master and device keys computed and stored, such that an eavesdropper would not be able to surmise either one. In one embodiment, the secure pairing process is performed using the ECDH key exchange algorithm.

Initially, a pre-pairing authentication step is performed in plaintext (210). In this step, the master verifies the device authenticity using either a challenge/response algorithm or a zero knowledge proof algorithm such as Zero-Knowledge Succinct Non-Interactive Argument of Knowledge (zk-SNARK) which refers to a proof construction where one can prove possession of certain information, e.g., a secret key, without revealing that information and without any interaction between the prover and verifier. A key agreement protocol such as ECDH with domain parameters agreed to a priori is started on both the master and devices. Private and public keys are generated and the public keys are exchanged in plaintext. Public key P is sent from the master to the device N (212) and public key Q is sent from device N to the master (214). They both compute a secret device key from their respective private keys and the public key they each received from the other. In accordance with the protocol, both sides compute the same device key, which can have any desired length, e.g., 128, 192, 256 bits, etc. Each side stores the device key in its non-volatile memory (NVM). The device key is typically generated only once and is never communicated over the wireless communications link. Note that the device key may be generated as the direct result of the ECDH operation, or may be further scrambled using whitening and/or one or more SHA algorithms in a manner agreed to a priori between master and device.

Note that the ECDH algorithm guarantees that the shared device key generated by both sides are identical. The algorithm also ensures that it will be extremely difficult for an eavesdropper having access to both public keys P and Q, but not either of the private keys, to compute the device key.

The master then starts a key derivation procedure to generate a shared session key by generating a random salt (e.g., 128 bits) and transmits it in plaintext to the device (216). Both the master and the device then generate a shared session key using the device key and the salt. Both master and device compute the same session key. Once generated, communications between the master and devices are secure by encrypting them using the shared session key.

The key derivation algorithm used in this step is a single or multiple iteration of one-way functions, such as the secure hash algorithm (SHA). The key derivation algorithm is used to "salt" the passwords and to provide a temporary session key such that the device key is not used directly in the encryption process and the actual encryption key will change periodically.

The master then either generates a random master key or retrieves a previously generated master key from NVM. The master key is encrypted using a suitable encryption mechanism such as Advanced Encryption Scheme (AES) in counter mode with the shared session key and is transmitted to the device (218). The device decrypts the master key using the shared session key and obtains the master key. The device stores the master key in its NVM. If the master key was newly generated on the master, the master also stores the master key in its NVM. Thus, with no additional user provisioning, the master and device N at the end of the process share a master key and device key which are used in subsequent downlink and uplink communications, respectively.

A diagram illustrating an example secure initial pairing mechanism between a master and a device is shown in FIG. 11. In this alternative embodiment, the secure pairing procedure dispenses with generating and transmitting the salt. Instead, the result of the ECDH process is used to directly generate the session key. Note that whitening or SHA algorithms can optionally be used on the ECDH result in order to generate the session key, as agreed upon a priori. A key agreement protocol such as ECDH is started on both the master and devices. Private and public keys are generated and the public keys are exchanged in plaintext. Public key P is sent from the master to the device N (220) and public key Q is sent from device N to the master (222). From their respective private keys and the exchanged public keys, both sides compute the same shared session key, which can have any desired length, e.g., 128, 192, 256 bits, etc.

The master then either generates a random master key or retrieves a previously generated master key from NVM. The master key is encrypted using a suitable encryption mechanism such as Advanced Encryption Scheme (AES) in counter mode with the shared session key and is transmitted to the device (224). The device decrypts the master key using the shared session key to yield the master key. The device stores the master key in its NVM. If the master key was newly generated on the master, the master also stores the master key in its NVM. The device then retrieves its device key, encrypts it using the session key, and sends it to the master (226). The master decrypts the device key using the shared session key and stores it in its NVM. Note that each side stores the device key in its respective NVM. The device key is typically generated only once and is never communicated over the wireless communications link.

Note that if the device key is retrieved but not generated then it must be programmed at the time of manufacture which creates a security vulnerability. With each master/device pairing, the master has knowledge of a corresponding device key, which never changes. Alternatively, the device can generate the master key which is also problematic because of the relatively large computing burden required. In another alternative embodiment, the master generates the device key and sends it encrypted to the device.

Figure 12:
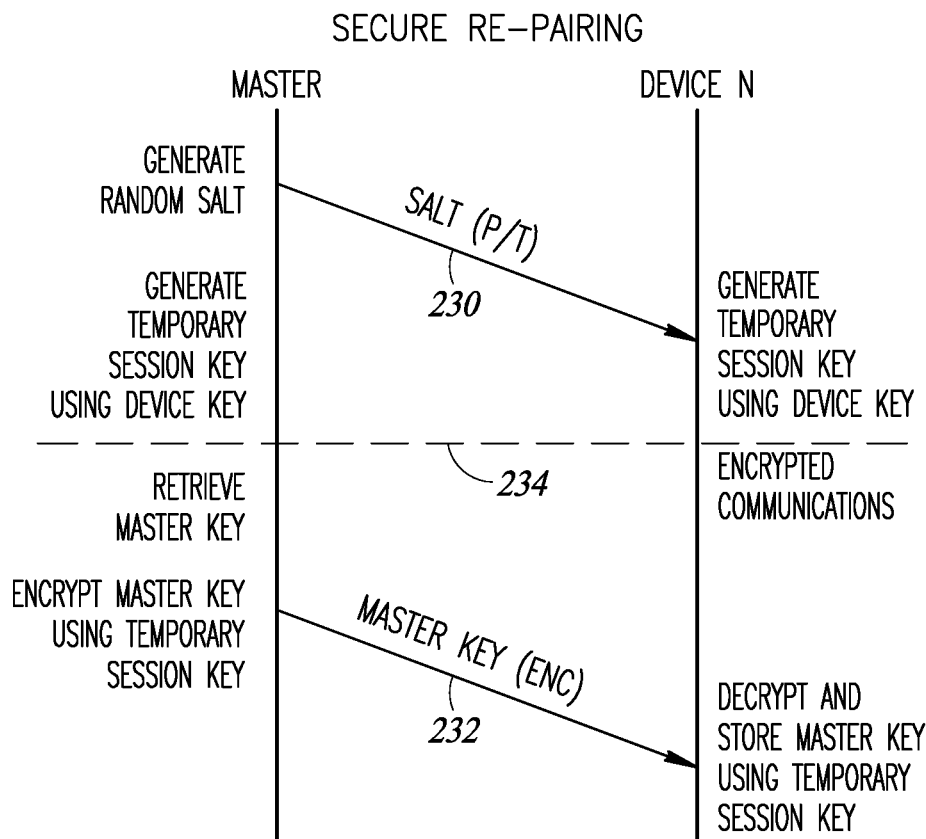
FIG. 12 is a diagram illustrating an example secure re-pairing mechanism between a master and a device.

A diagram illustrating an example secure re-pairing mechanism between a master and a device is shown in FIG. 12. The secure re-pairing procedure is performed in the event communications between the master and a device is disrupted for any reason. It assumes the master already has the device key from a previous initial pairing process. During the re-pairing process, the master key is transmitted to the device to enable secure downlink communications.

First, the master generates a random salt and transmits it in plaintext to the device (230). Both master and device then generate a temporary session key using their respective device keys previously stored in NVM. The master then retrieves its master key from memory, encrypts it using the session key, and transmits it to the device (232). The device decrypts the master key using the session key and stores the decrypted master key in its NVM.

Figure 13:
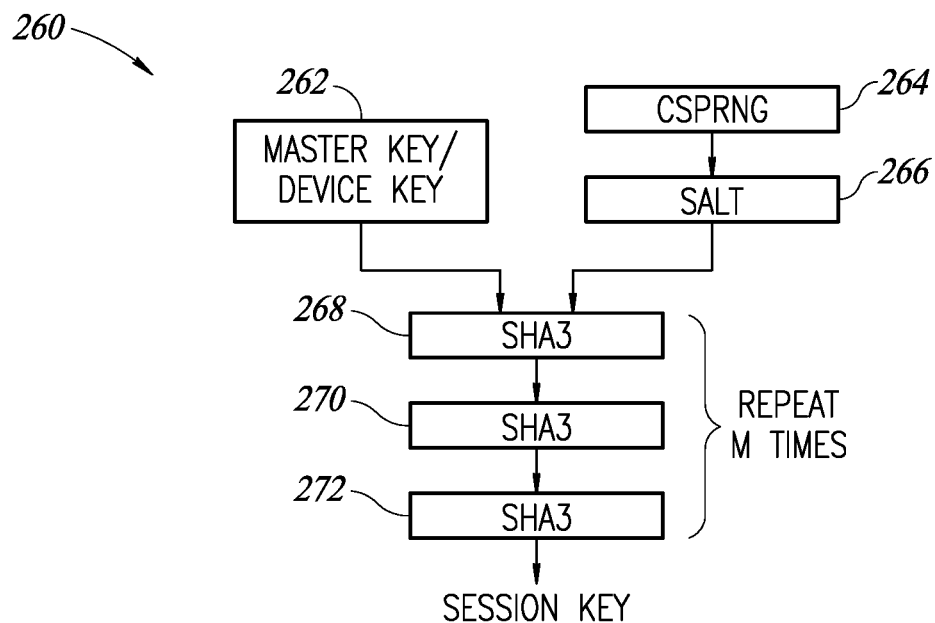
FIG. 13 is a diagram illustrating an example mechanism for generating a session key.

A diagram illustrating an example mechanism for generating a session key is shown in FIG. 13. The key derivation algorithm, generally referenced 260, is performed by both the master and the devices in generating session keys. The algorithm combines (e.g., concatenates) a permanent key that may comprise either the master key or the device key 262 (e.g., 256 bits) with a salt 256 (e.g., 128 bits) to generate a message (e.g., 384 bits). This message undergoes several SHA 268, 270, 272 processes (e.g., SHA3-256). The first SHA 268 generates a first digest (256 bits). This digest is then hashed again 270 to generate a second digest. The second digest is hashed a third time 272 in this example to generate a third digest. This third digest is used as the session key. In general, the SHA is repeated M times. Note that the salt 266 is generated using a CSPRNG 264, described in more detail infra.

Example C code implementation of an example key derivation function is provided below in Listing 1.

---

Listing 1: C code implementation of a key derivation function

```
int sha3_256(uint8_t* out, size_t outlen, const uint8_t* in, size_t inlen);
void key_derive(unsigned char *master, unsigned char *salt, unsigned char *dkey)
{
    unsigned char tmp1[48], tmp2[32];
    memcpy(tmp1, master,32);
    memcpy(tmp1+32, salt,16);
```

Listing 1: C code implementation of a key derivation function

```
sha3_256(tmp2, 32, tmp1, 48);
sha3_256(tmp1, 32, tmp2, 32);
sha3_256(tmp2, 32, tmp1, 32);
memcpy(dkey, tmp2, 32);
```

Example stimuli (in byte hexadecimal notation) and results of the example key derivation function shown above are provided below:
Master=0xde132efe9c96e60ddf1ad36cb01d4faf060ec986-1931ac306538e266c4ace9ae
Nonce=0xbb597fd5619768e66088bd4a991de829
Derived Key=0xc2b6a76501bc9336025b09406b8c 2c52fab 721b6a1d5cde1444508d69bb26202

Figure 14:
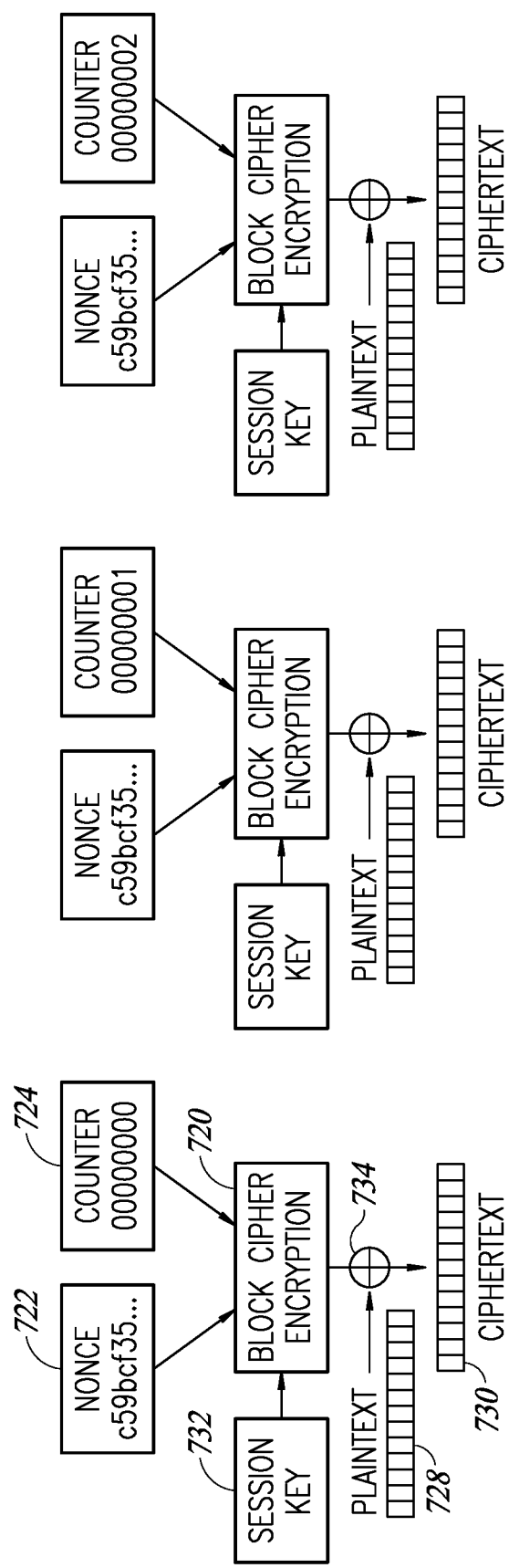
FIG. 14 is a diagram illustrating an example encryption block cypher using a counter input.

A diagram illustrating an example encryption block cypher using a counter input is shown in FIG. 14. The well-known Advanced Encryption Standard (AES) is an industry standard specification for an algorithm used to encrypt data between two parties to prevent non-parties from accessing the encrypted data. AES uses a block cipher, which employs a fixed-length group of bits, or a block, to encrypt data. Thus, the same block size of data is encrypted at all times, with a larger data file requiring multiple rounds of encryption to fully encode the information.

AES includes three phases: an initial round, the middle rounds, and a final round. The initial round uses a generated key based on an initialization vector (IV) to encrypt the initial input block. The middle rounds include four steps: substitution based on a lookup table (i.e., an S-box), row shifting, column mixing, and adding a roundkey to the result based on a subkey generated from the initial key. The final round excludes the column mixing step. These rounds are repeated in total either 10, 12, or 14 times, depending on the level of encryption employed.

AES can be implemented in multiple modes, including electronic codebook (ECB), cipher block chaining (CBC), and counter mode, where each mode is a unique implementation of the AES block cipher. The counter mode is implemented by transforming the block cipher into a stream cipher, and allows for increased efficiency, and lower latency, e.g., via parallelization, compared to other modes.

FIG. 14 depicts AES counter mode of operation. A constant nonce 722 (known a priori) is concatenated/combined with a counter value 724 and then encrypted using a block cipher 720 using a symmetric secret key 732, i.e. the session key. The block cypher functions to generate a block of cypher bits which is XORed 734 with the plaintext input 728 to generate the cyphertext output 730. For additional data to be encrypted, the counter is incremented and another block of cypher bits are generated and so on. The decryption operation is identical, except that the plaintext and ciphertext are swapped. Note that optionally, the concatenated nonce and counter value can undergo a one way function such as a Secure Hash Algorithm (SHA), e.g., SHA2 or SHA3.

Note that the AES counter mode operate relatively efficiently and with almost no added latency on a multiprocessor machine where data blocks can be encrypted in parallel. When implemented on an IO-Link Wireless system, the runtime of AES in counter mode may last for approximately 106-137 microseconds, and only require 4.2-10 kb of memory. This allows the method to be implemented on various individual devices, such as a master and a device without requiring powerful computing power of an external host or server.

In one embodiment, the counter may comprise 32 bits and is incremented (advanced) every 128 bits of cypher text being generated. In addition, the counter may be reset upon installation of a new session key or can continue to be advanced.

Figure 15:
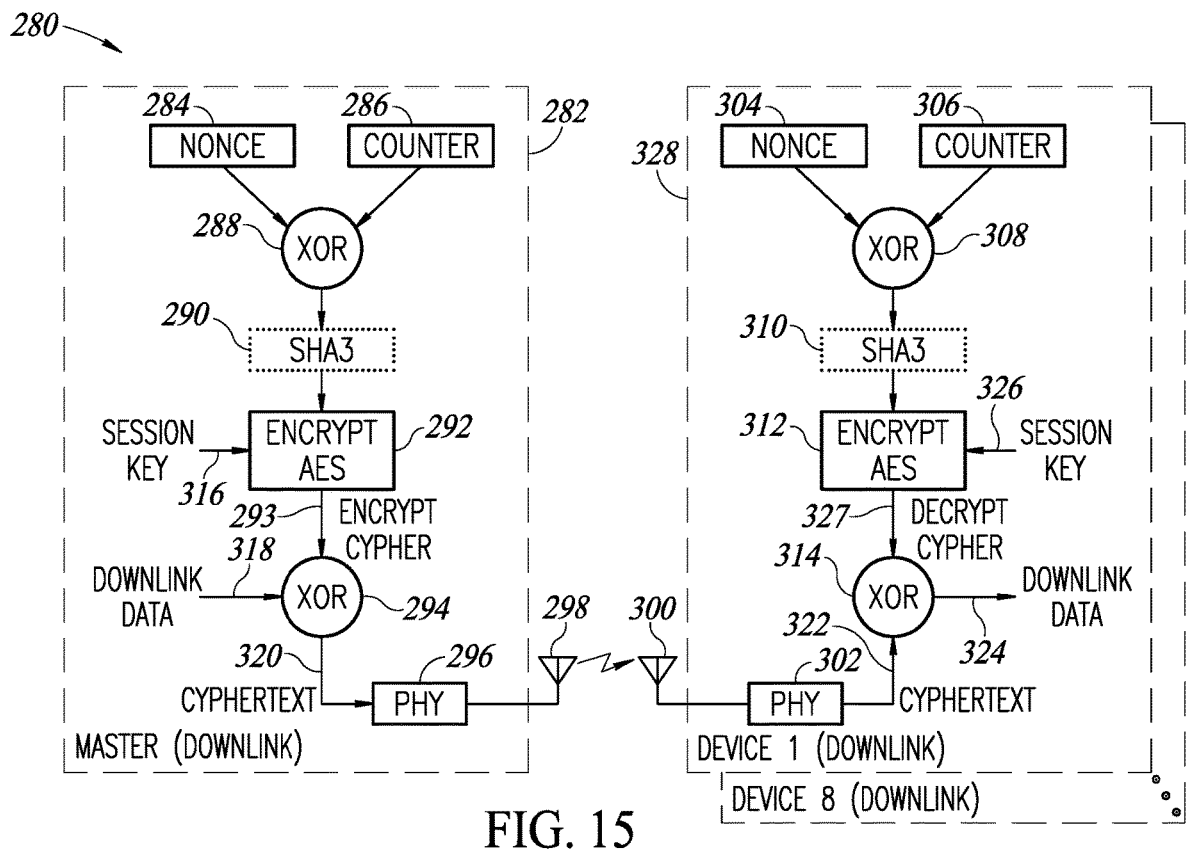
FIG. 15 is a block diagram illustrating a first example downlink transmission mechanism.

A block diagram illustrating a first example downlink transmission mechanism is shown in FIG. 15. The mechanism, generally referenced 280, comprises a master 282 and a plurality of devices 328 (up to five tracks, eight device each track). The master 282 comprises a nonce 284 and counter value 286 that are XORed 288, with the results undergoing an optional SHA3 hashing operation 290. The results are then input to an AES encrypt operation 292 that uses the current shared downlink session key 316 (as an encryption key) to generate encrypt cypher bits 293. The encrypt cypher bits 293 are then XORed 294 with the downlink plaintext payload 318 to generate cyphertext 320 that is modulated and multicast by the PHY layer 296 over the wireless communications link such as the IO-Link Wireless network to the plurality of devices via antenna 298.

On each device 328, the downlink cyphertext packet is received over the wireless communications link via antenna 300 by the PHY layer 302 which demodulates the cyphertext payload. The nonce 304 and counter value 306 are XORed 308, with the results undergoing an optional SHA3 hashing operation 310. The results are then input to an AES encrypt operation 312 that uses the current shared downlink session key 326 (as an encryption key) to generate decrypt cypher bits 327. The decrypt cypher bits 327 are then XORed 314 with the downlink cyphertext 322 to generate the original downlink plaintext payload 324. Note that the counters 286, 306 in the master and device, respectively are synchronized.

Note that encrypt cypher bits 293 and decrypt cypher bits 327 are identical since AES encrypt operations 292 and 312 are identical, nonces 284 and 304 are the same number agreed upon a priori, counters 286 and 306 are synchronized, and downlink session keys 316 and 326 are shared (i.e. derived from the same keys), using the same KDF. Therefore, since all the inputs to the AES encrypt blocks 292 and 312 are identical then their outputs, namely encrypt cypher bits 293 and decrypt cypher bits 327, are identical. It follows then that since downlink data 318 has been effectively XORed twice with the same bits, then downlink data 318 (to be encrypted) and downlink data 324 (decrypted) are identical.

Furthermore, an advantage of this embodiment is that encrypt cypher bits 293 and decrypt cypher bits 327 can be computed (1) before the PHY layer 296 needs to modulate the data for transmission and (2) before PHY layer 302 needs to demodulate the received data respectively, since the inputs to encrypt AES blocks 292 and 312 do not depend on either downlink payload data 318 or cyphertext 322, respectively. Thus, encrypt cypherbits 293 and decrypt cypher bits 327 can be computed beforehand, stored in memory and retrieved when needed thereby not adding any latency to the link.

Figure 16:
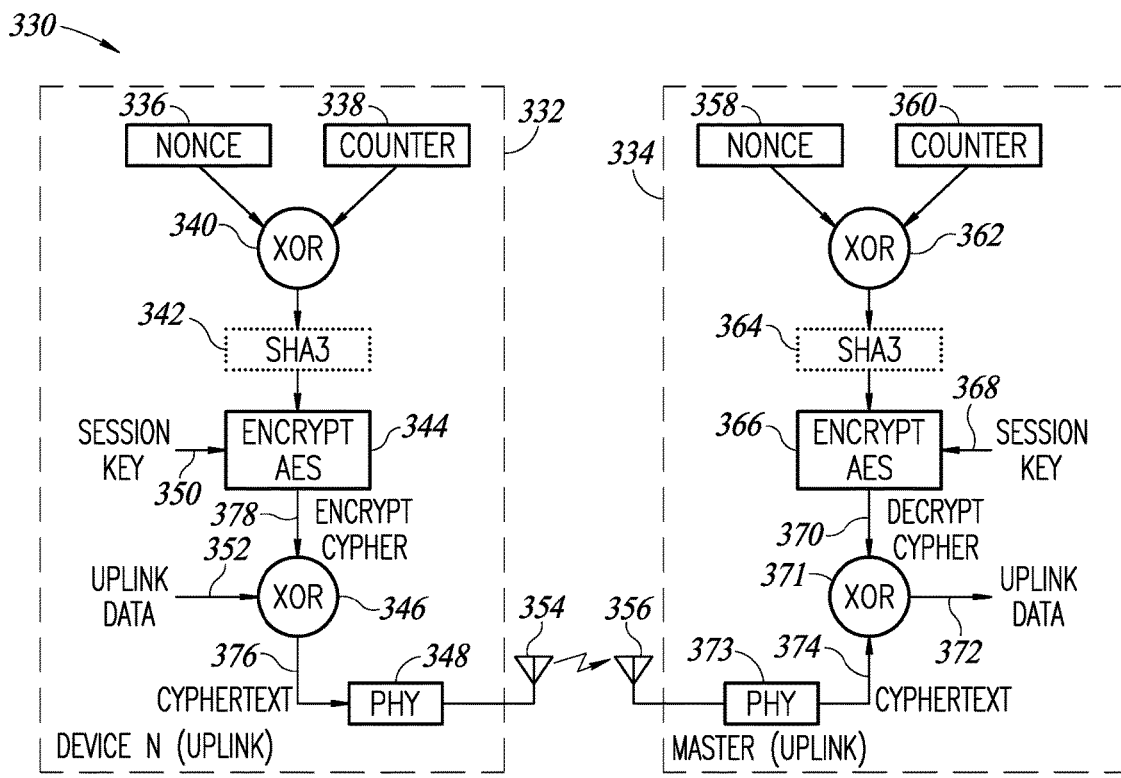
FIG. 16 is a block diagram illustrating a first example uplink transmission mechanism.

A block diagram illustrating a first example uplink transmission mechanism is shown in FIG. 16. The mechanism, generally referenced 330, comprises one of the devices N 334 in the network. The device N 332 comprises a nonce 336 and the output of a counter 338 that are XORed 340, with the results undergoing an optional SHA3 hashing operation 342. The results are then input to an AES encrypt operation 344 that uses the current shared device N uplink session key 350 to generate encrypt cypher bits 378. The encrypt cypher bits 378 are then XORed 346 with the uplink plaintext payload 352 to generate cyphertext 376 that is modulated and unicast by the PHY layer 348 over the wireless communications link such as the IO-Link Wireless network to the master via antenna 354.

On the master, the uplink cyphertext packet is received over the wireless communications link via antenna 356 by the PHY layer 373 which demodulates the cyphertext payload. The nonce 358 and output of a counter 360 are XORed 362, with the results undergoing an optional SHA3 hashing operation 364. The results are then input to an AES encrypt operation 366 that uses the current shared session key 368 to generate decrypt cypher bits 370. The decrypt cypher bits are then XORed 371 with the uplink cyphertext 374 to generate the original uplink plaintext payload 372. Note that the counters 338, 360 in device N and master, respectively are synchronized.

Note that encrypt cypher bits 378 and decrypt cypher bits 370 are identical since AES encrypt operations 344 and 366 are identical, nonces 336 and 358 are the same number agreed upon a priori, counters 338 and 360 are synchronized, and uplink session keys 350 and 368 are shared (i.e. derived from the same keys). Therefore, since all the inputs to the AES encrypt blocks 344 and 366 are identical then their outputs, namely encrypt cypher bits 378 and decrypt cypher bits 370, are identical. It follows then that since uplink data 352 has been effectively XORed twice with the same bits, then uplink data 352 (to be encrypted) and uplink data 372 (decrypted) are identical.

Furthermore, a significant advantage of this embodiment is that encrypt cypher bits 378 and decrypt cypher bits 370 can be computed (1) before the PHY layer 348 needs to modulate the data for transmission and (2) before PHY layer 373 needs to demodulate the received data respectively, since the inputs to encrypt AES blocks 344 and 366 do not depend on either uplink payload data 352 or cyphertext 374, respectively. Thus, encrypt cypherbits 378 and decrypt cypher bits 370 can be computed beforehand, stored in memory and retrieved when needed thereby not adding any latency to the link.

A diagram illustrating an example downlink packet structure in more detail is shown in FIG. 17. The example packet, generally referenced 380, comprises a two-byte preamble 382, three-byte sync word 384, one-byte master ID 385, downlink payload 386, and four-byte CRC 388. In one embodiment, only the payload 386 is encrypted, since this field is sensitive and must be secured. The other packet fields are not encrypted, allowing for a more efficient encryption process, as well as permitting use of a hardware implementation of the CRC32.

A diagram illustrating an example short uplink packet structure in more detail is shown in FIG. 18. The example packet, generally referenced 390, comprises a two-byte preamble 392, three-byte sync word 394, one-byte master ID 396, uplink payload 398, four-byte CRC 400, and one-byte guard 402.

A diagram illustrating an example long uplink packet structure in more detail is shown in FIG. 19. The example packet, generally referenced 410, comprises a two-byte preamble 412, three-byte sync word 414, one-byte master ID 416, uplink payload 418, four-byte CRC 420, and one-byte guard 422.

Similar to the downlink packet, only the uplink payload 398, 418 are encrypted in the short and long uplink packets, respectively. The other packet fields are not encrypted thereby increasing efficiency without compromising security.

Figure 20:
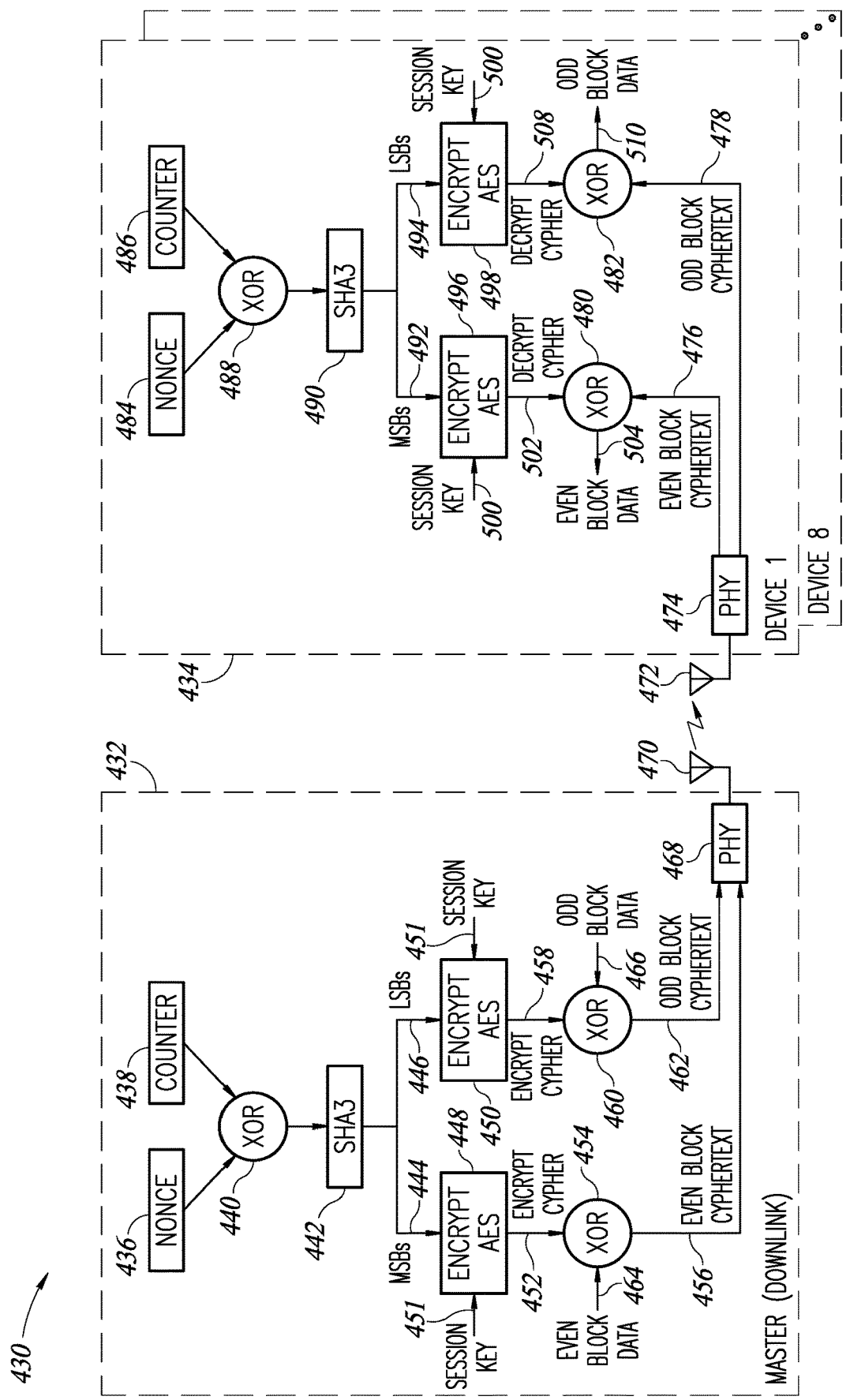
FIG. 20 is a block diagram illustrating a second example downlink transmission mechanism.

A block diagram illustrating a second example downlink transmission mechanism is shown in FIG. 20. The mechanism, generally referenced 430, comprises a master 432 and a plurality of devices 434 (up to five tracks, eight device each track). The master 432 comprises a nonce 436 and counter value 438 that are XORed 440, with the results undergoing a SHA3 hashing operation 442. The results are then split into upper most significant bits (MSBs) 444 and lower least significant bits (LSBs) 446.

It is noted that it is preferable to apply bit scrambling on the data entering the AES, when splitting the results into MSBs and LSBs. This is because the MSBs may not change between consecutive AES blocks. Thus, the encryption cypher on all the even data blocks will yield the same result. If the input is divisible by the AES block length (i.e. 128) then the transmission is prone to replay attacks and perhaps known plaintext attacks, which is highly undesirable. In one embodiment, a SHA is applied before the AES which functions scramble the input to the AES. Changing even a single bit at the input of the SHA makes each bit at the output nearly 50% likely to change. Therefore, by using a SHA it is highly likely (virtually 100%) that each block will have a different input.

In one embodiment, the MSBs and LSBs are each 128 bits wide. The MSBs are input to an AES encrypt operation 448 that uses the current shared downlink session key 451 to generate encrypt cypher bits 452. The LSBs are input to an AES encrypt operation 450 that uses the same current shared downlink session key 451 to generate encrypt cypher bits 458. Encrypt cypher bits 452 are then XORed 454 with the even downlink plaintext block payload 464 to generate even block cyphertext 456. Encrypt cypher bits 458 are then XORed 460 with the odd downlink plaintext block payload 466 to generate odd block cyphertext 462. The even and odd cyphertext 456, 460, respectively, are then modulated and multicast by the PHY layer 468 over the wireless communications link such as the IO-Link Wireless network to the plurality of devices via antenna 470.

Note that this encryption operation is both highly secure (i.e. different input to the AES for every block and temporary session keys) and also highly effective in terms of computational power since the costly SHA operation is used for two AES operations and generates 256 cypher bits. Note also that the terms "even block data" and "odd block data" may refer to alternating chunks of 128 bits and may comprise multiple data packets.

On each device 434, the downlink cyphertext packet is received over the wireless communications link via antenna 472 by the PHY layer 474 which demodulates the cyphertext payload to generate an even cyphertext block 476 and an odd cyphertext block 478. The nonce 484 and counter value 486 are XORed 488, with the results undergoing a SHA3 hashing operation 490 to further scramble the bits. The results are then divided into MSBs 492 and LSBs 494. In one embodiment, the MSBs and LSBs are each 128 bits wide. The MSBs are input to an AES encrypt operation 496 that uses the current shared downlink session key 500 to generate decrypt cypher bits 502. The LSBs are input to an AES encrypt operation 498 that uses the same current shared downlink session key 500 to generate decrypt cypher bits 508. Decrypt cypher bits 502 are then XORed 480 with the even downlink block cyphertext 476 to generate even original downlink plaintext block payload 504. Decrypt cypher bits 508 are then XORed 482 with the odd downlink block cyphertext 478 to generate odd original downlink plaintext block payload 510. Note that the counters 438, 486 in the master and device, respectively are synchronized. Note also that the terms "even block cyphertext" and "odd block cyphertext" may refer to alternating chunks of 128 bits of cyphertext and may comprise multiple data packets.

Figure 21:
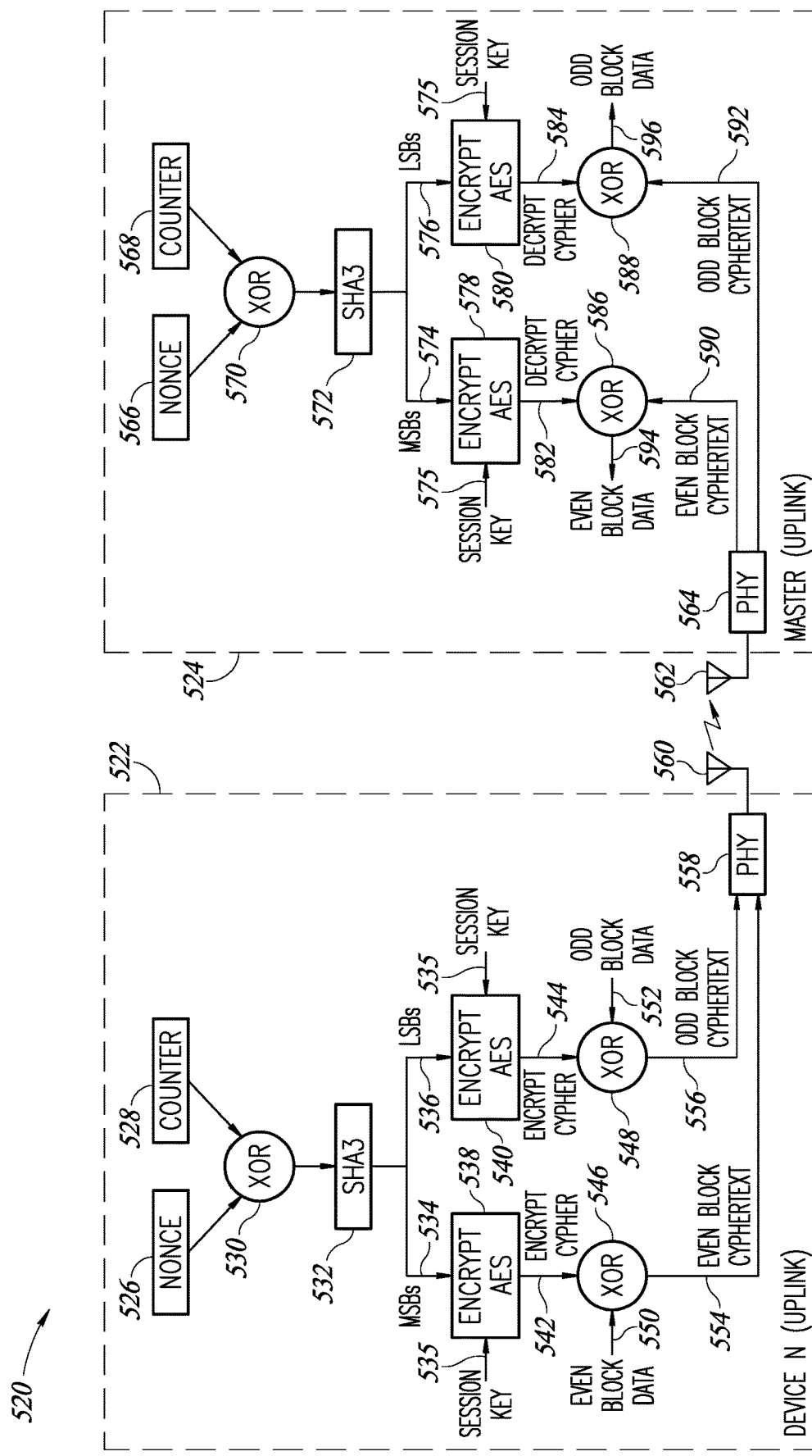
FIG. 21 is a block diagram illustrating a second example uplink transmission mechanism.

A block diagram illustrating a second example uplink transmission mechanism is shown in FIG. 21. The mechanism, generally referenced 520, comprises one device N of a plurality of devices 522 (up to five tracks, eight device each track) and a master 524. Device N 522 comprises a nonce 526 and counter value 528 that are XORed 530, with the results undergoing a SHA3 hashing operation 532. The results are then split into upper most significant bits (MSBs) 534 and lower least significant bits (LSBs) 536. In one embodiment, the MSBs and LSBs are each 128 bits wide. The MSBs are input to an AES encrypt operation 538 that uses the current shared device N uplink session key 535 to generate encrypt cypher bits 542. The LSBs are input to an AES encrypt operation 540 that uses the same current shared device N uplink session key 535 to generate encrypt cypher 544. Encrypt cypher 542 is then XORed 546 with the even uplink plaintext block payload 550 to generate even block cyphertext 554. Encrypt cypher 544 is then XORed 548 with the odd uplink plaintext block payload 552 to generate odd block cyphertext 556. The even and odd cyphertext 554, 556, respectively, are then modulated and unicast by the PHY layer 558 over the wireless communications link such as the IO-Link Wireless network to the master via antenna 560.

Note that this encryption operation is both highly secure (i.e. different input to the AES for every block and temporary session keys) and also highly effective in terms of computational power since the costly SHA operation is used for two AES operations and generates 256 cypher bits. Note also that the terms "even block data" and "odd block data" may refer to alternating chunks of 128 bits and may comprise multiple data packets.

On the master 524, the uplink cyphertext packet is received over the wireless communications link via antenna 562 by the PHY layer 564 which demodulates the cyphertext payload to generate an even cyphertext block 590 and an odd cyphertext block 592. The nonce 566 and counter value 568 are XORed 570, with the results undergoing a SHA3 hashing operation 572. The results are then divided into MSBs 574 and LSBs 576. The MSBs are input to an AES encrypt operation 578 that uses the current shared device N uplink session key 575 to generate decrypt cypher 582. The LSBs are input to an AES decrypt operation 580 that uses the same current shared device N uplink session key 575 to generate decrypt cypher 584. Decrypt cypher 582 is then XORed 586 with the even uplink block cyphertext 590 to generate even original uplink plaintext block payload 594. Decrypt cypher 584 is then XORed 588 with the odd uplink block cyphertext 592 to generate odd original uplink plaintext block payload 596. Note that the counters 528, 568 in the device and master, respectively are synchronized. Note also that the terms "even block data" and "odd block data" may refer to alternating chunks of 128 bits and may comprise multiple data packets.

Figure 22:
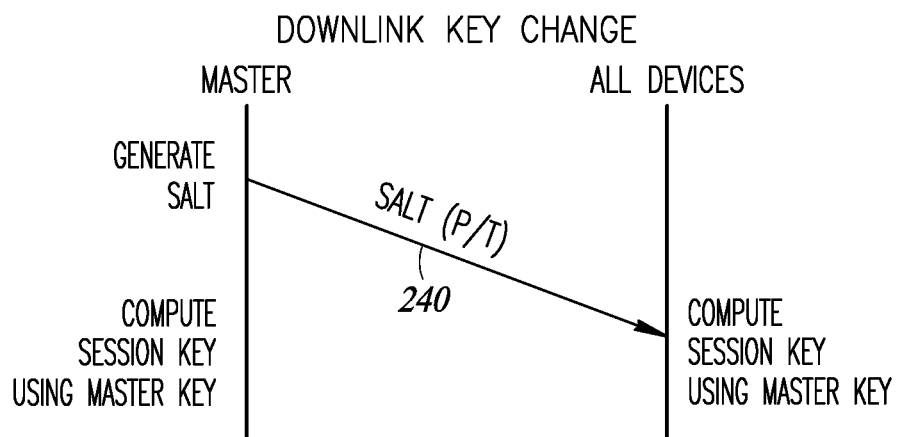
FIG. 22 is a diagram illustrating an example downlink key change mechanism.

As described supra, the session keys are periodically generated anew in both the master and the devices for both downlink and uplink communications. A diagram illustrating an example downlink key change mechanism is shown in FIG. 22. Once a downlink key change event is triggered, a random salt is generated by the master and transmitted in plaintext to all devices (240). Both the master and the devices then compute a new session key using the salt and the previously stored master key, using a key derivation function (KDF), e.g., multiple iterations of the SHA block. The new session key is then used by both the master and devices to generate cypher bits for the PHY layer to encrypt and decrypt downlink communications.

Figure 23:
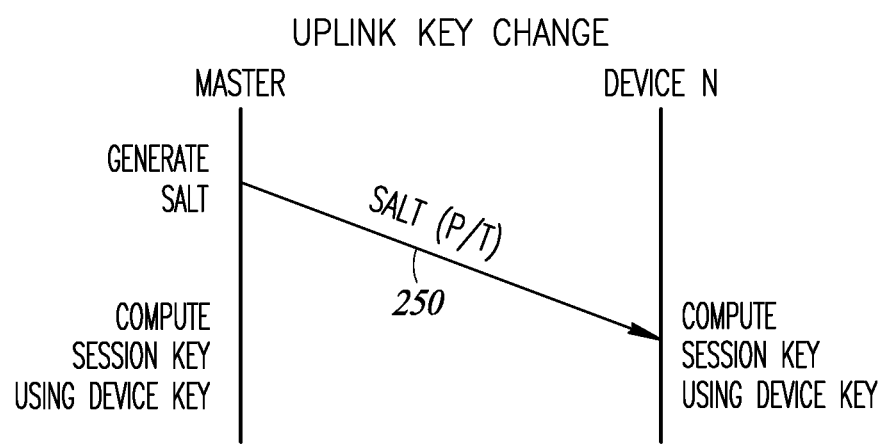
FIG. 23 is a diagram illustrating an example uplink key change mechanism.
Figure 24:
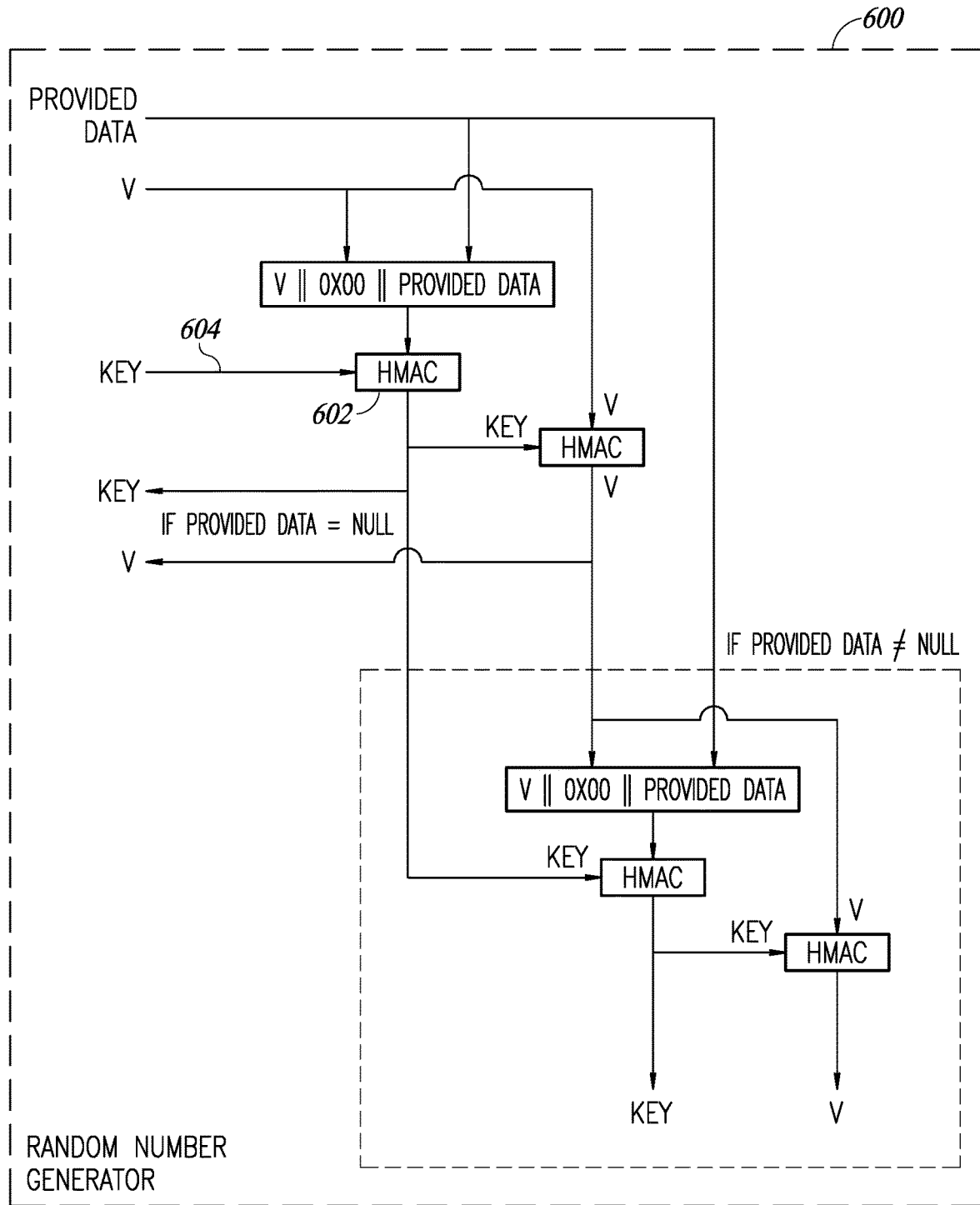
FIG. 24 is a diagram illustrating an example random number generator suitable for use with the present invention.

A diagram illustrating an example uplink key change mechanism is shown in FIG. 23. Once an uplink key change event is triggered, a random salt is generated by the master and transmitted in plaintext to the particular device N (250). Both the master and the device N then compute a new session key using the salt and the previously stored device key using a key derivation function (KDF), e.g., multiple iterations of the SHA block. The new session key is then used by both the master and device N to generate cypher bits for the PHY layer to encrypt and decrypt uplink communications A diagram illustrating an example random number generator suitable for use with the present invention is shown in FIG. 24. In one embodiment, the random number generator, generally referenced 600, comprises an implementation of the CSPRNG that uses the HMAC_DRBG variant of the NIST/FIPS-800-90A standard. The generator 600 comprises several hash-based message authentication code (HMAC) blocks 602 that receive secret cryptographic keys 604. An example initialization routine of the HMAC_DRBG is presented below in Listing 2. This function is meant to place the deterministic random bit generator (DRBG) in a "random" state corresponding to the entropy input and a personalization string. The circuit of FIG. 24 shows the update mechanism of the DRBG.

Listing 2: DRBG initialization routine

Input: bitstring (entropy_input, personalization_string).
Output: bitstring(V,Key), integer reseed_counter.
Process:
    seed_material = entropy_input || personalization_string.
    Set Key to outlen bits of zeros.
    Set V to outlen/8 bytes of 0x01.
    (Key, V) = HMAC_DRBG_Update (seed_material, Key, V).
    reseed_counter = 1.
    Return(V, Key, reseed counter).

Note that standard RFC6979 implements a CSPRNG using SHA2-256 as a MAC function (i.e. the key is the initialization seed) and was written in order to obtain random field elements in elliptic curve digital signature algorithms (ECDSAs). It uses a private key as the entropy input and produces an arbitrary set of pseudo-random bits.

In one embodiment, each unit (i.e. master or device) has a pre-provisioned private key of length 1024 bits. This key is provisioned at production using a high entropy true random number generator with a physical entropy source. Each unit keeps stores the DRBG state (K, V). When new "random" bits are to be generated (i.e. for secure pairing or key generation), it updates the DRBG K and V and generates the "random" bits.

Figure 25:
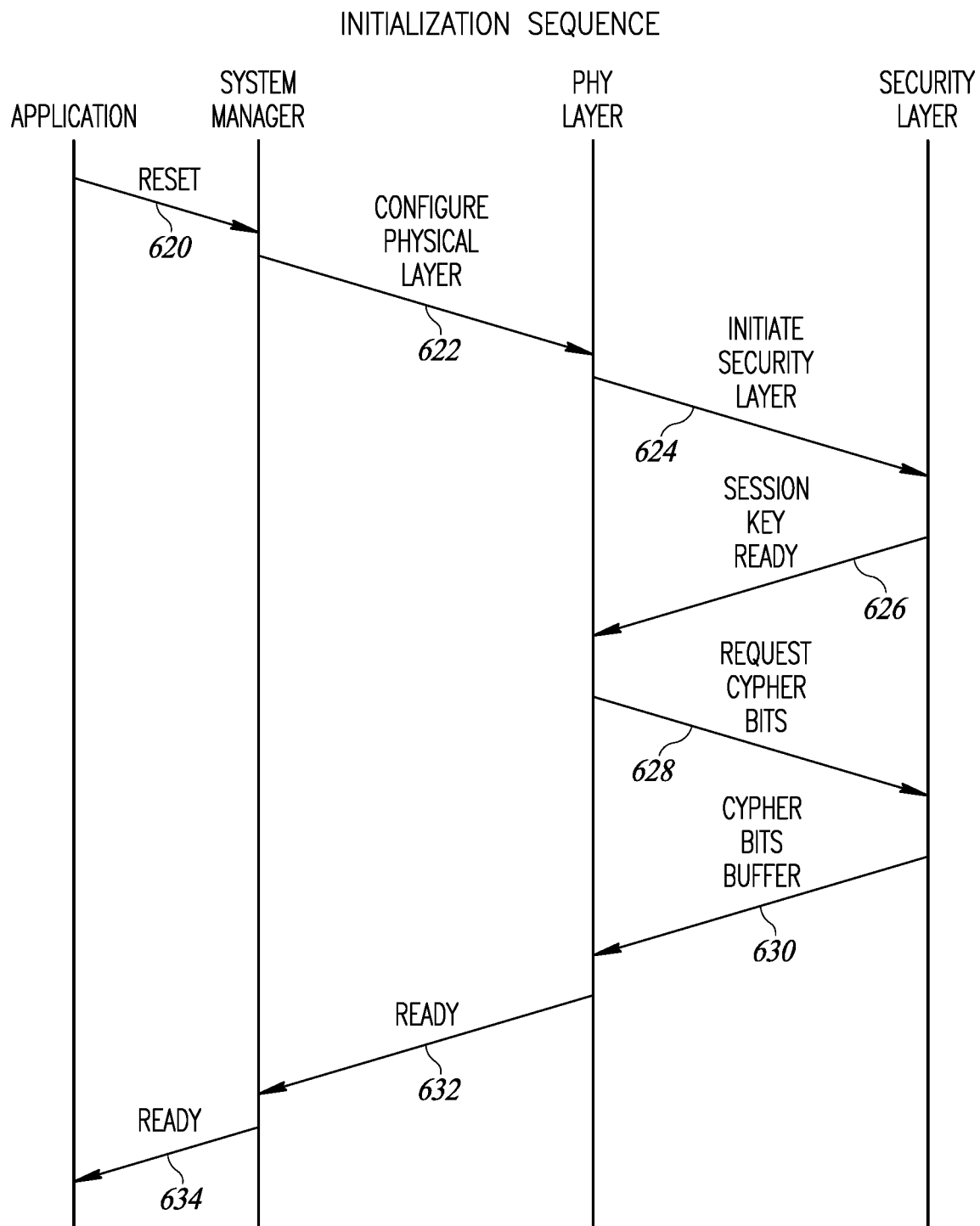
FIG. 25 is a diagram illustrating an example initialization sequence.

A diagram illustrating an example initialization sequence performed by both master and devices is shown in FIG. 25. During initialization the application layer issues a reset 620 to the system manager. The system manager sends a 'configure physical layer' message 622 to the PHY layer which includes several parameters including: (1) the set of frequencies permitted to be used by the IO-Link Wireless system; and (2) a parameter affecting the synchronization word transmitted at the beginning of each downlink and uplink. If the device does not have a configuration or parameters, they are provided by the master during the pairing process.

In response to message 622, the PHY layer sends an 'initiate security layer' message 624 to the security layer. Security layer initiation does not involve any parameters. It allows the security layer to perform any initial calculation that is needed before the master/device can begin with communications. The security layer performs initial pairing operations and obtains the first session key. Once the session key is obtained, it sends a 'session key ready' message 626 to the PHY layer. The PHY layer sends the first request for cypher bits 628 to the security layer. In response, the security layer generates a block of cypher bits and returns them in a buffer 630 to the PHY layer for use in encryption/decryption operations. The PHY layer signals 'ready' 632 to the system manager which then signals 'ready' 634 to the application layer. Secure downlink and uplink communications can then proceed.

Figure 26A:
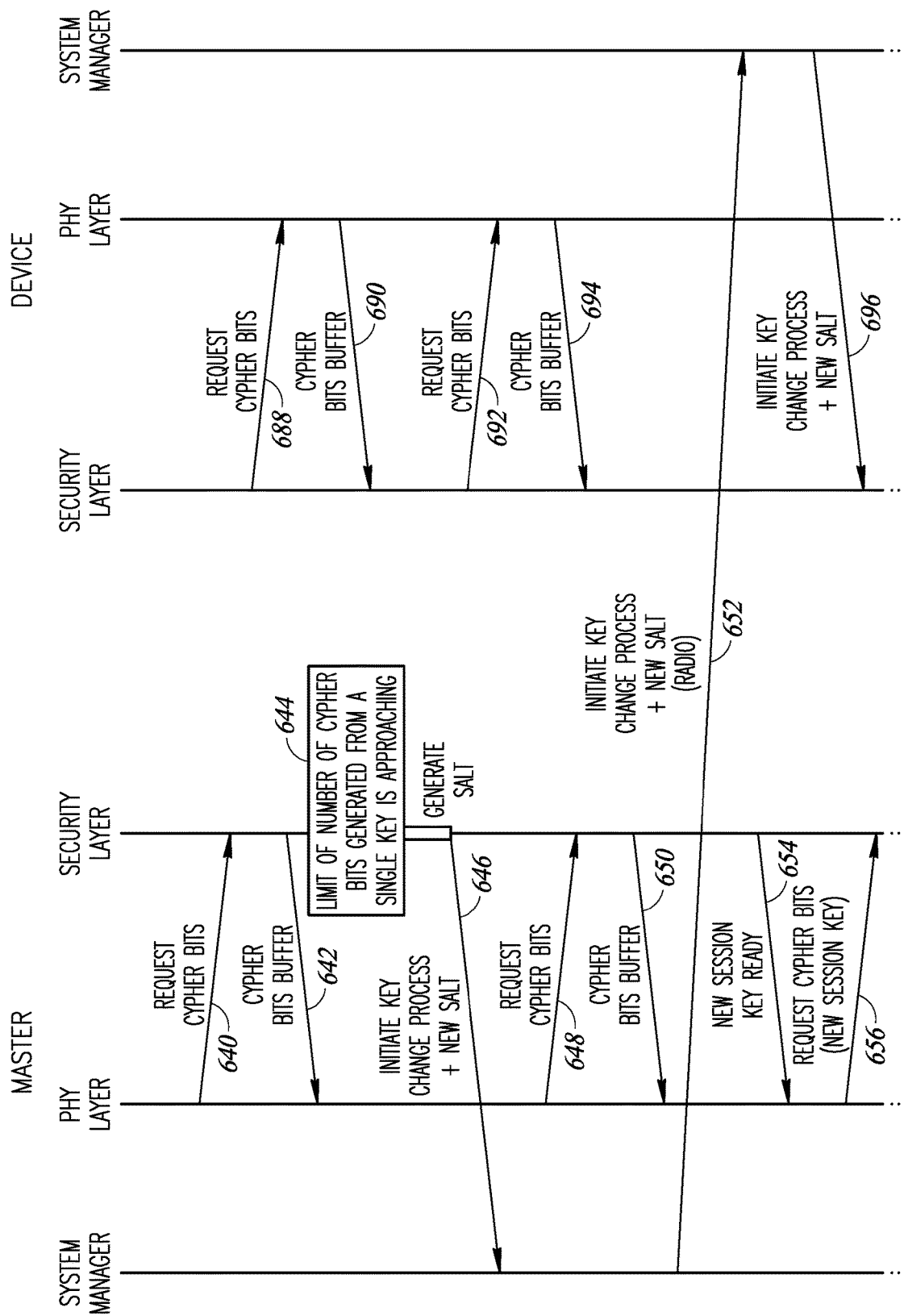
FIGS. 26A, 26B, 26C are a diagram illustrating an example key derivation, key change, and jump mechanism.
Figure 26B:
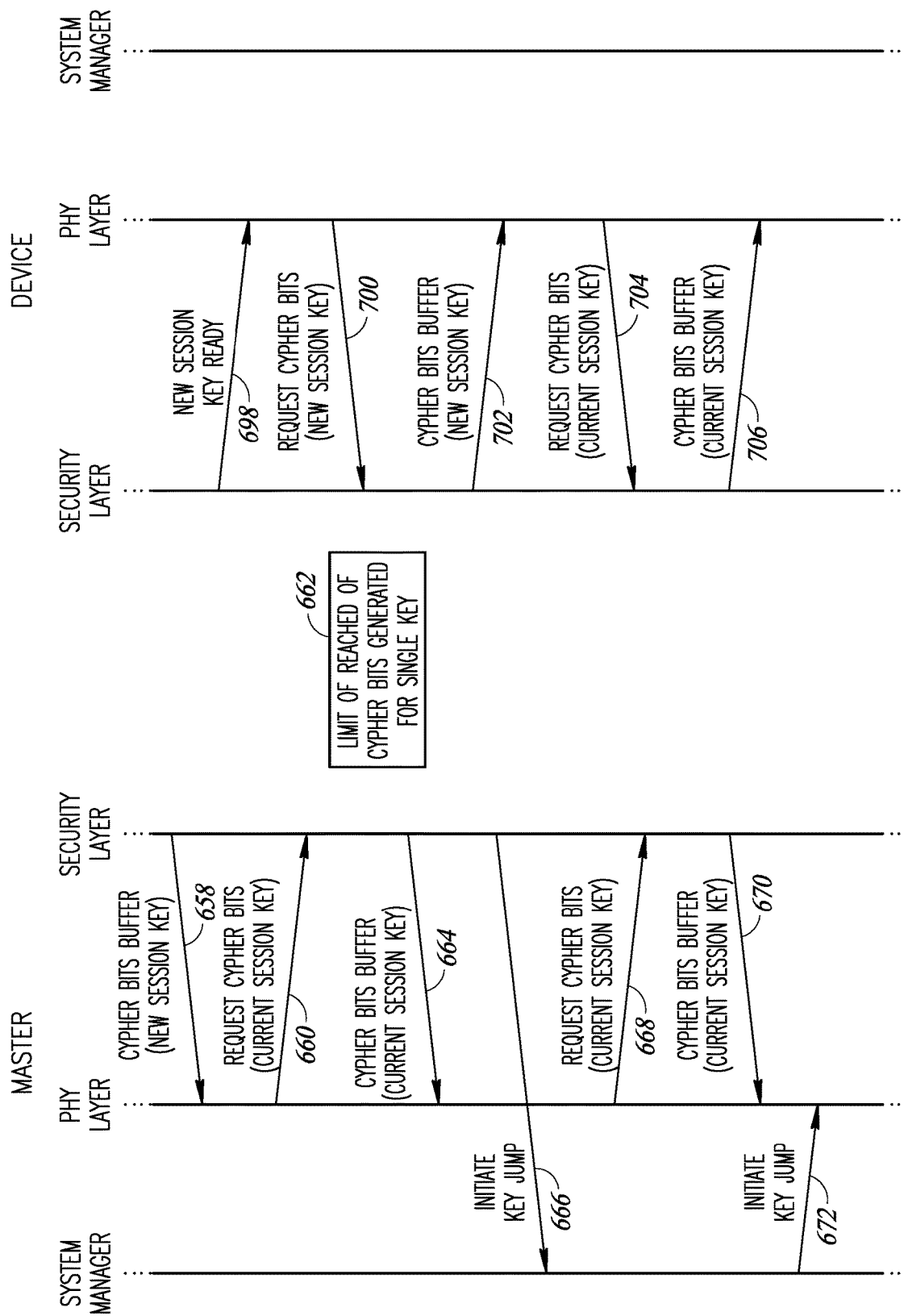
Figure 26C:
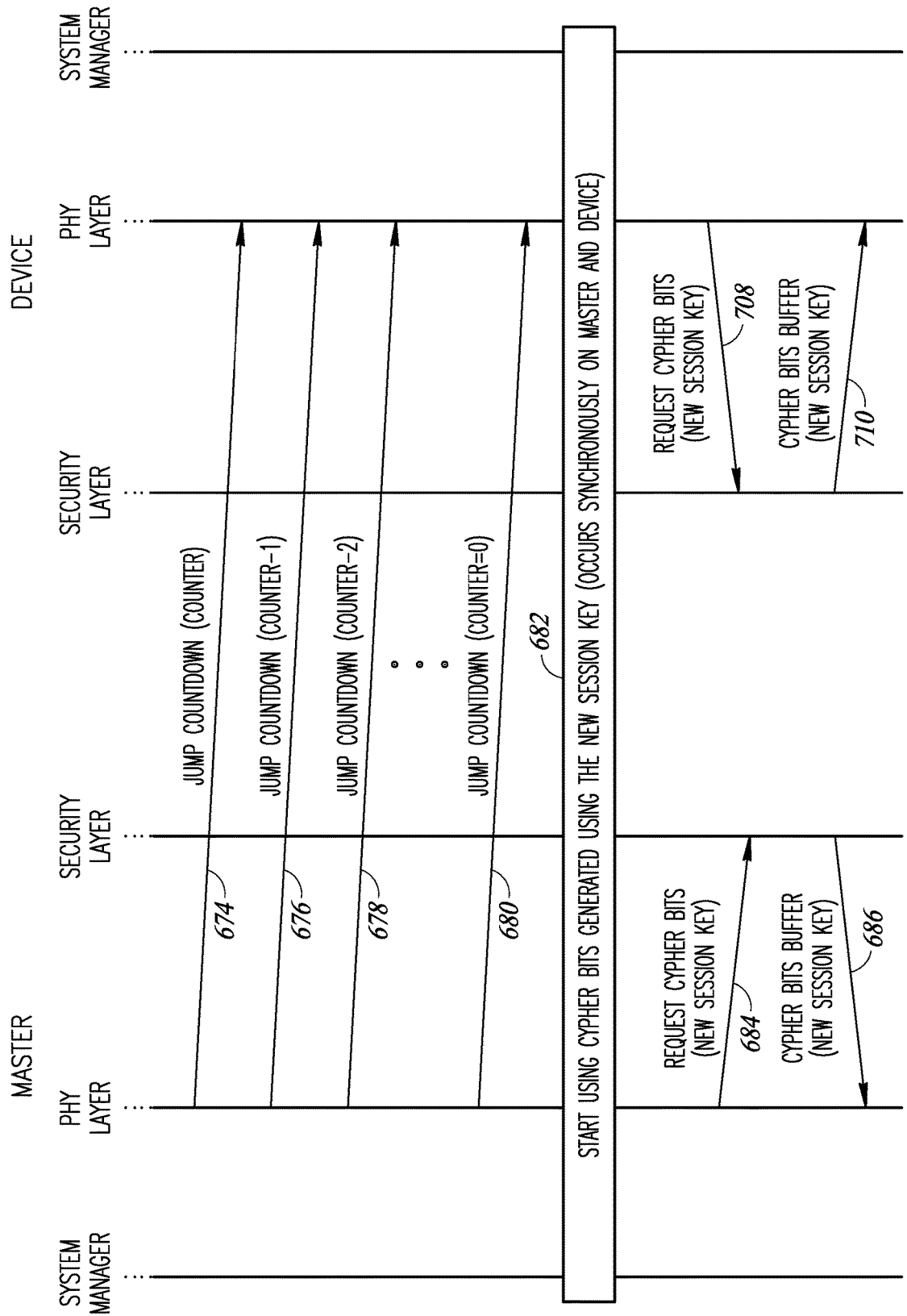

A diagram illustrating an example key derivation, key change, and key jump mechanism is shown in FIGS. 26A, 26B, 26C. The example scenario is between system manager, PHY layer, and security layer in the master and a device N. During operation of the master and device, the PHY layer continually requests cypher bits from the security layer. In one embodiment, the security layer is responsible for generating the cypher bits upon request from the PHY layer. The PHY layer in both the master and device receives blocks of cypher bits from the security layer and uses them to encrypt and decrypt communications over the wireless communications channel. Only a finite number of cypher bits are generated for one session key. Once the limit is reached, a new session key is generated and blocks of cypher bits are generated using the new session key. A key jump process transitions the master and device to the new session key.

During operation of the master, the PHY layer periodically requests cypher bits 640 from the security layer which are then XORed with the downlink/uplink payloads. The cypher bits are sent in a buffer 642 to the PHY layer. Similarly on the device, cypher bits are periodically requested 688 from the security layer by the PHY layer. The cypher bits are sent in a buffer 690 to the PHY layer. On the device, this process continues, where the PHY layer consumes cypher bits obtained from the security layer, 692, 694.

At some point in time, the master detects that the limit of the number of cypher bits generated for the current session key is approaching 644. In response, the master initiates a key change procedure 646 and generates a new salt using the CSPRNG as described supra. Meanwhile, the process of consuming cypher bits and requesting additional blocks of cypher bits from the security layer continues 648, 650.

When the system manager is ready to proceed with the key change process, it sends an 'initiate key change' process message 652 to the system manager of the device along with the new salt which is sent in plaintext. The device, in response, initiates the key change process 696 and passes the new salt to the security layer. The security layer generates a new session key and signals to the PHY layer that the new session is ready 698. In response, the PHY layer requests blocks of cypher bits using the new session key 700. The cypher bits buffer 702 received generated with the new session are stored ready to be used after the key jump occurs switching operation to the new session key. In the meantime, until the key jump, the device continues to request cypher bits 704 and receive cypher bit buffers 706 generated using the current session key.

On the master, the security layer signals to the PHY layer that the new session key is ready 654. In response, the PHY layer requests blocks of cypher bits using the new session key 656. The cypher bits buffer 658 received generated with the new session are stored ready to be used after the key jump occurs switching operation to the new session key. In the meantime, until the key jump, the device continues to request cypher bits 660 and receive cypher bit buffers 664 generated using the current session key.

Eventually, the security layer in the master detects that the number of cypher bits generated using the current session key has reached its limit 662. In response, the security layer initiates a key jump 666 to the system manager. Blocks of cypher bits continue to be requested 668 by the PHY layer and buffers of cypher bits 670 provided to the PHY layer from the security layer.

Once the system manager initiates the key jump 672 to the PHY layer, a jump counter in the PHY layer begins counting down to zero. The value of the jump counter (i.e. the jump count) is sent to the device as it is decremented 674, 676, 678, 680. For example, assuming the counter starts at ten, as the counter is decremented, it's value is sent to the device. The rate at which the counter is decremented is known to both the master and devices. The jump count is repeatedly sent to the device to ensure that at least one of the jump count messages arrives safely at the device. Only one jump count message needs be received by the device. Once received by the device, the device knows exactly when to switch over to using the new session key.

Eventually, the jump count reaches zero 680 and both master and device synchronously cease using cypher bits generated with the current session key and start using cypher bits generated with the new session key 682. From this point on, cypher bits are generated on both master and device using the new session key. Thus, on the master, requests for blocks of cypher bits 684 are received by the security layer from the PHY layer. In response, cypher bit blocks 686 generated using the new session key are generated and forwarded to the PHY layer for use in encrypting and decrypting downlink and uplink communications.

Similarly on the device, requests for blocks of cypher bits 708 are received by the security layer from the PHY layer. In response, cypher bit blocks 710 generated using the new session key are generated and forwarded to the PHY layer for use in encrypting and decrypting downlink and uplink communications.

Those skilled in the art will recognize that the boundaries between logic and circuit blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediary components. Likewise, any two components, so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the claims, any reference signs placed between parentheses shall not be construed as limiting the claim. The use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first," "second," etc. are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of secure communications between a master and a plurality of devices in a wireless communications network, the method comprising:
    encrypting, on said master, downlink plaintext for multicast transmission to a plurality of devices over a wireless communications link utilizing a symmetric key encryption algorithm in accordance with a first counter value and a shared symmetric session key; and
    decrypting, on one of said devices, multicast downlink cyphertext received from said master over said wireless communications link utilizing a symmetric key decryption algorithm in accordance with a second counter value and said shared symmetric session key, wherein:
        a first nonce is XORed with said first counter value to generate a first XOR output; and
        a second nonce is XORed with said second counter value to generate a second XOR output, and wherein said first XOR output is input to a first SHA3 algorithm before said symmetric key encryption algorithm, and said second XOR output is input to a second SHA3 algorithm before said symmetric key decryption algorithm.

2. The method according to claim 1, wherein said shared session key for encryption or decryption of downlink data is shared between said master and said plurality of devices and is generated individually by both said master and said plurality of devices.

3. The method according to claim 1, wherein said first counter and said second counter comprise a block counter that is incremented periodically.

4. The method according to claim 1, wherein said symmetric key encryption algorithm comprises an AES-256 encryption algorithm with counter mode, and said symmetric key decryption algorithm comprises an AES-256 decryption algorithm with counter mode.

5. The method according to claim 1, wherein:
    said downlink plaintext is XORed with cypher bits generated by said symmetric key encryption algorithm to generate downlink cyphertext for transmission to said plurality of devices; and
    said downlink cyphertext received from said master is XORed with cypher bits generated by said symmetric key decryption algorithm to generate downlink plaintext.

6. The method according to claim 1, further comprising:
    utilizing said symmetric key encryption algorithm to generate first blocks of cypher bits that are used to encrypt downlink plaintext; and
    utilizing said symmetric key decryption algorithm to generate second blocks of cypher bits that are used to decrypt downlink cyphertext.

7. The method according to claim 1, further comprising said master and said plurality of devices periodically generating a new shared symmetric session key to be used with said symmetric key encryption algorithm and said symmetric key decryption algorithm.

8. A method of secure communications between a plurality of devices and a master in a wireless communications network, the method comprising:
    encrypting uplink plaintext for unicast transmission to said master over a wireless communications link utilizing a symmetric key encryption algorithm in accordance with a first counter value and a shared symmetric session key; and
    decrypting unicast uplink cyphertext received from one of said devices over said wireless communications link utilizing a symmetric key decryption algorithm in accordance with a second counter value and said shared symmetric session key, wherein:
        a first nonce is XORed with said first counter value to generate a first XOR output; and
        a second nonce is XORed with said second counter value to generate a second XOR output, and wherein said first XOR output is input to a first SHA3 algorithm before said symmetric key encryption algorithm, and said second XOR output is input to a second SHA3 algorithm before said symmetric key decryption algorithm.

9. The method according to claim 8, wherein each device has its own shared session key that is shared with said master for encrypting unicast uplink plaintext to said master and for decrypting unicast cyphertext from said device, each shared session key generated individually by each device and said master.

10. The method according to claim 8, wherein said first counter and said second counter comprise a block counter that is incremented periodically.

11. The method according to claim 8, wherein said symmetric key encryption algorithm comprises AES-256 encryption algorithm with counter mode, and said symmetric key decryption algorithm comprises AES-256 decryption algorithm with counter mode.

12. The method according to claim 8, wherein:
said uplink plaintext is XORed with cypher bits generated by said symmetric key encryption algorithm to generate uplink cyphertext for transmission to said master; and
said uplink cyphertext received from one of said devices is XORed with cypher bits generated by said symmetric key decryption algorithm to generate uplink plaintext.

13. The method according to claim 8, further comprising:
utilizing said symmetric key encryption algorithm to generate first blocks of cypher bits that are used to encrypt uplink plaintext; and
utilizing said symmetric key decryption algorithm to generate second blocks of cypher bits that are used to decrypt uplink cyphertext.

14. The method according to claim 8, further comprising each individual device and said master periodically generating a new shared symmetric session key to be used with said symmetric key encryption algorithm and said symmetric key decryption algorithm.

15. A method of secure communications between a master and a plurality of devices in a wireless communications network, the method comprising:
encrypting downlink plaintext for multicast transmission to a plurality of devices over a wireless communications link utilizing a symmetric key encryption algorithm in accordance with a first counter value and a first symmetric session key; and
decrypting unicast uplink cyphertext received from each device over said wireless communications link utilizing a symmetric key decryption algorithm in accordance with a second counter value and a second symmetric session key, a first nonce is XORed with said first counter value to generate a first XOR output; and
a second nonce is XORed with said second counter value to generate a second XOR output, and wherein said first XOR output is input to a first SHA3 algorithm before said symmetric key encryption algorithm, and said second XOR output is input to a second SHA3 algorithm before said symmetric key decryption algorithm.

16. A method of secure communications between a plurality of devices and a master in a wireless communications network, the method comprising:
encrypting uplink plaintext for unicast transmission to said master over a wireless communications link utilizing a symmetric key encryption algorithm in accordance with a first nonce, a first counter value, and a first symmetric session key; and
decrypting multicast downlink cyphertext received from said master over said wireless communications link utilizing a symmetric key decryption algorithm in accordance with a second nonce, a second counter value, and a second symmetric session key wherein:
the first nonce is XORed with said first counter value to generate a first XOR output; and
the second nonce is XORed with said second counter value to generate a second XOR output, and wherein said first XOR output is input to a first SHA3 algorithm before said symmetric key encryption algorithm, and said second XOR output is input to a second SHA3 algorithm before said symmetric key decryption algorithm.

17. An apparatus for secure communications between a master and a plurality of devices in a wireless communications network, comprising:
a frequency hopping radio transmitter;
a frequency hopping radio receiver;
a processor coupled to and operative to control said frequency hopping radio transmitter and said frequency hopping radio receiver;
said processor programmed to:
encrypt downlink plaintext for multicast transmission to a plurality of devices over a wireless communications link utilizing a symmetric key encryption algorithm in accordance with a first nonce, a first counter value, and a first symmetric session key; and
decrypt unicast uplink cyphertext received from each device over said wireless communications link utilizing a symmetric key decryption algorithm in accordance with a second nonce, a second counter value, and a second symmetric session key, wherein:
a first nonce is X0Red with said first counter value to generate a first XOR output; and
a second nonce is X0Red with said second counter value to generate a second XOR output, and wherein said first XOR output is input to a first SHA3 algorithm before said symmetric key encryption algorithm, and said second XOR output is input to a second SHA3 algorithm before said symmetric key decryption algorithm.

18. The apparatus according to claim 17, wherein said radio transmitter and said radio receiver are configured to conform to an IO-Link Wireless standard.

19. An apparatus for secure communications between a plurality of devices and a master in a wireless communications network, comprising:
a frequency hopping radio transmitter;
a frequency hopping radio receiver;
a processor coupled to and operative to control said frequency hopping radio transmitter and said frequency hopping radio receiver;
said processor programmed to:
encrypt uplink plaintext for unicast transmission to said master over a wireless communications link utilizing a symmetric key encryption algorithm in accordance with a first nonce, a first counter value, and a first symmetric session key; and
decrypt multicast downlink cyphertext received from said master over said wireless communications link utilizing a symmetric key decryption algorithm in accordance with a second nonce, a second counter value, and a second symmetric session key, wherein:
a first nonce is XORed with said first counter value to generate a first XOR output; and
a second nonce is XORed with said second counter value to generate a second XOR output, and wherein said first XOR output is input to a first SHA3 algorithm before said symmetric key encryption algorithm, and said second XOR output is input to a second SHA3 algorithm before said symmetric key decryption algorithm.

20. The apparatus according to claim 19, wherein said radio transmitter and said radio receiver are configured to conform to an IO-Link Wireless standard.

\* \* \* \* \*